United States Patent
Sridharan

(10) Patent No.: US 11,241,733 B1
(45) Date of Patent: Feb. 8, 2022

(54) TUNED INTRICATE INTERNAL DISTRIBUTIONS OF MATERIAL AND GEOMETRY USING, IN WHOLE OR IN PART, ADDITIVE MANUFACTURING TECHNOLOGIES AND APPLICATIONS THEREOF TO METHODS, SYSTEMS, APPARATUSES FOR ATTENUATION SOLIDIFICATION TIME OF ENCAPSULATED PHASE CHANGE MATERIALS

(71) Applicant: Prashanth Sridharan, Dunedin, FL (US)

(72) Inventor: Prashanth Sridharan, Dunedin, FL (US)

(*) Notice: Subject to any disclaimer, the term of this patent is extended or adjusted under 35 U.S.C. 154(b) by 0 days.

(21) Appl. No.: 17/106,647

(22) Filed: Nov. 30, 2020

(51) Int. Cl.
  *B33Y 10/00* (2015.01)
  *B22D 23/00* (2006.01)
  *C09K 5/02* (2006.01)
  *B28B 1/00* (2006.01)
  *B33Y 80/00* (2015.01)

(52) U.S. Cl.
  CPC ............ *B22D 23/003* (2013.01); *B28B 1/001* (2013.01); *B33Y 10/00* (2014.12); *B33Y 80/00* (2014.12); *C09K 5/02* (2013.01)

(58) Field of Classification Search
  CPC ........ B22D 23/003; B28B 1/001; B29C 64/10
  See application file for complete search history.

(56) References Cited

U.S. PATENT DOCUMENTS

| 7,866,377 | B2 | 1/2011 | Slaughter | |
| 2003/0145447 | A1* | 8/2003 | Moseley | C09K 5/063 29/458 |
| 2014/0014493 | A1 | 1/2014 | Ryan | |
| 2014/0197355 | A1 | 7/2014 | Ram et al. | |
| 2015/0128528 | A1* | 5/2015 | Lacaze | B29C 64/371 53/431 |
| 2018/0328673 | A1* | 11/2018 | Stoia | F28F 1/025 |

OTHER PUBLICATIONS

Elmozughi, Ali, "Heat Transfer Analysis of Encapsulated Phase Change Materials for Thermal Energy Storage" (2014). Theses and Dissertations. Paper 1479.
Regin, Felix, S.C. Solanki, and J.S. Saini. "An analysis of a packed bed latent heat thermal energy storage system using PCM capsules: Numerical investigation" (2009). Renewable Energy 34 1765-1773.
Mehling, Harald and Cabeza, Luisa F., "Heat and cold storage with PCM; An up to date introduction into basics and applications." Heat and Mass Transfer ISSN: 1860-4846. 2008 Springer-Verlag Berlin Heidelberg.

(Continued)

*Primary Examiner* — James Sanders
(74) *Attorney, Agent, or Firm* — Miles & Stockbridge P.C.; David R. Schaffer

(57) ABSTRACT

Phase change materials (PCM) that are used for temporary thermal energy storage (TES), and, more particularly, encapsulated PCM (ePCM) where the encapsulated material can include one or more different materials, each with melting points that are significantly higher than the PCM and which is created in whole or in part using a variety of different additive manufacturing technologies.

20 Claims, 22 Drawing Sheets

(56) References Cited

OTHER PUBLICATIONS

B. Zalba et al., "Review on thermal energy storage with phase change: materials, heat transfer analysis and applications." Applied Thermal Engineering 23 (2003) 251-283.
Wohlers, Terry and Gornet, Tim, "History of Additive Manufacturing." Wohlers Report 2016.
Huang, Yong and Leu, Ming C., "Frontiers of Additive Manufacturing Research and Education," Report of NSF Additive Manufacturing Workshop (Jul. 11 and 12, 2013). Published by University of Florida, Center for Manufacturing Innovation (Mar. 2014).
U S. Department of Energy, "5. Concentrating Solar Power: Technologies, Cost, and Performance." SunShot Vision Study (Feb. 2012), pp. 97-123.
Wadley, Haydn N. G., "Multifunctional periodic cellular metals." Phil. Trans. R. Soc. A (2006) 364, 31-68; doi:10.1098/rsta.2005.1697; Published online Dec. 2, 2005.
Scherer, M.R.J., "Chapter 2 Gyroid and Gyroid-Like Surfaces." Double-Gyroid-Structured Functional Materials, 7. Springer Theses, DOI: 10.1007/978-3-319-00354-2_2, © Springer International Publishing Switzerland 2013.
Walker, Jason M., Bodamer, Emily, Kleinfehn, Alex, Luo, Yuanyuan, Becker, Matthew and Dean, David, "Design and mechanical characterization of solid and highly porous 3D printed poly(propylene fumarate) scaffolds." Prog Addit Manuf (2017) 2:99-108; DOI 10.1007/s40964-017-0021-3.
Mahmoud, Dalia and Elbestawi, Mohamed A., "Lattice Structures and Functionally Graded Materials Applications in Additive Manufacturing of Orthopedic Implants: A Review." J. Manuf. Mater. Process. 2017, 1, 13; doi:10.3390/jmmp1020013.
Wohlgemuth Meinhard, Yufa, Nataliya, Hoffman, James and Thomas, Edwin L., "Triply Periodic Bicontinuous Cubic Microdomain Morphologies by Symmetries." Macromolecules 2001, 34, 6083-6089.

\* cited by examiner

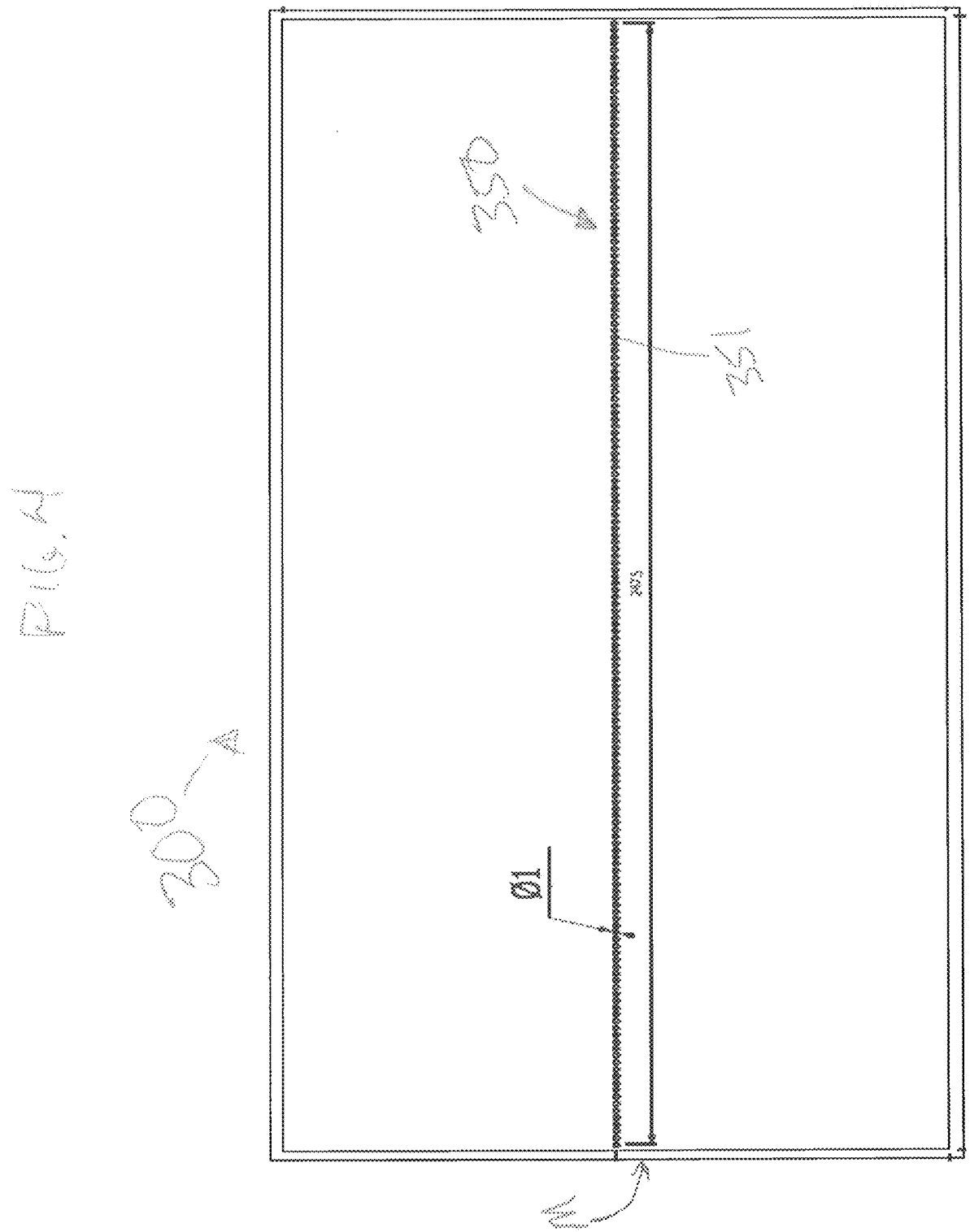

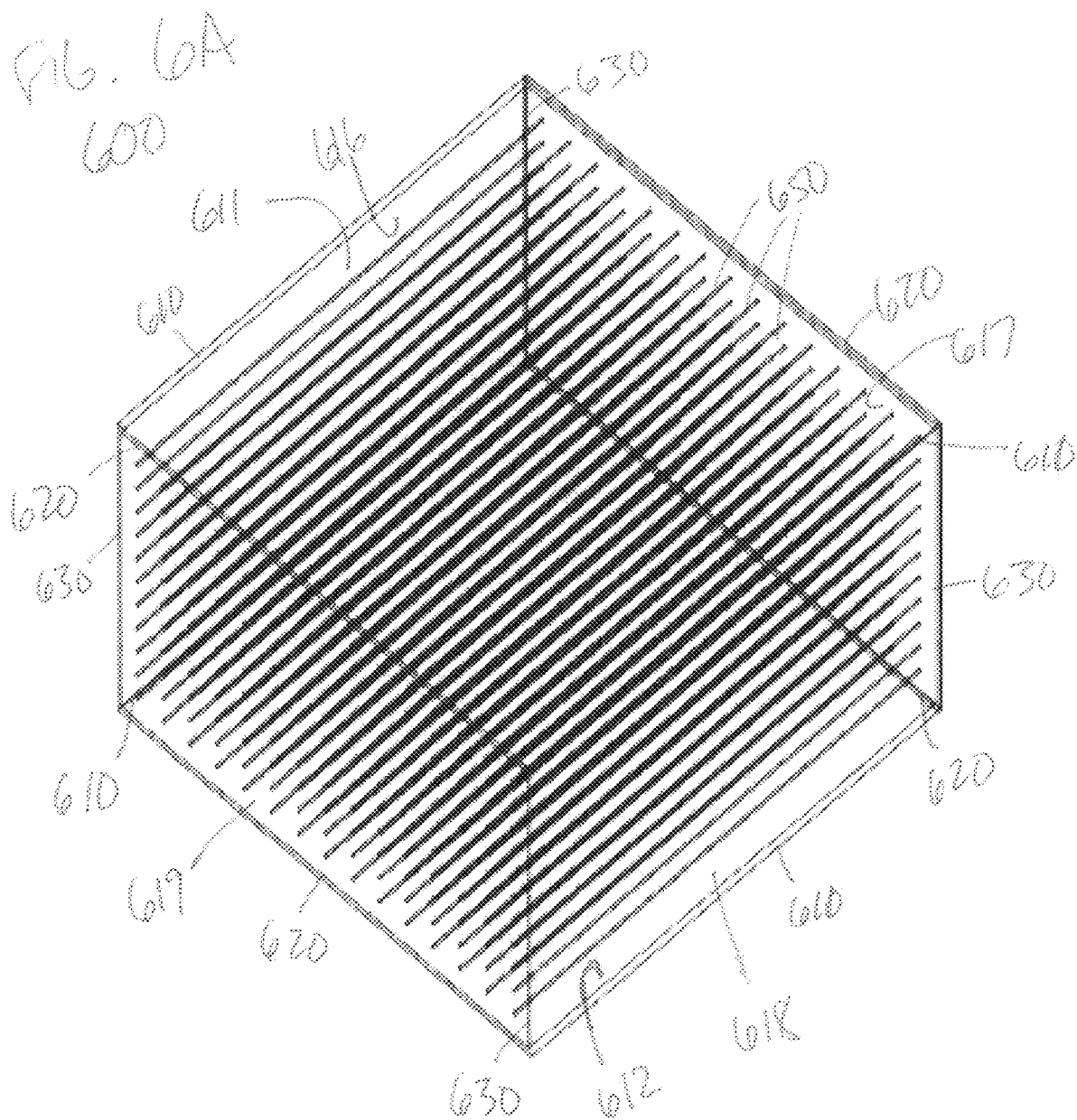

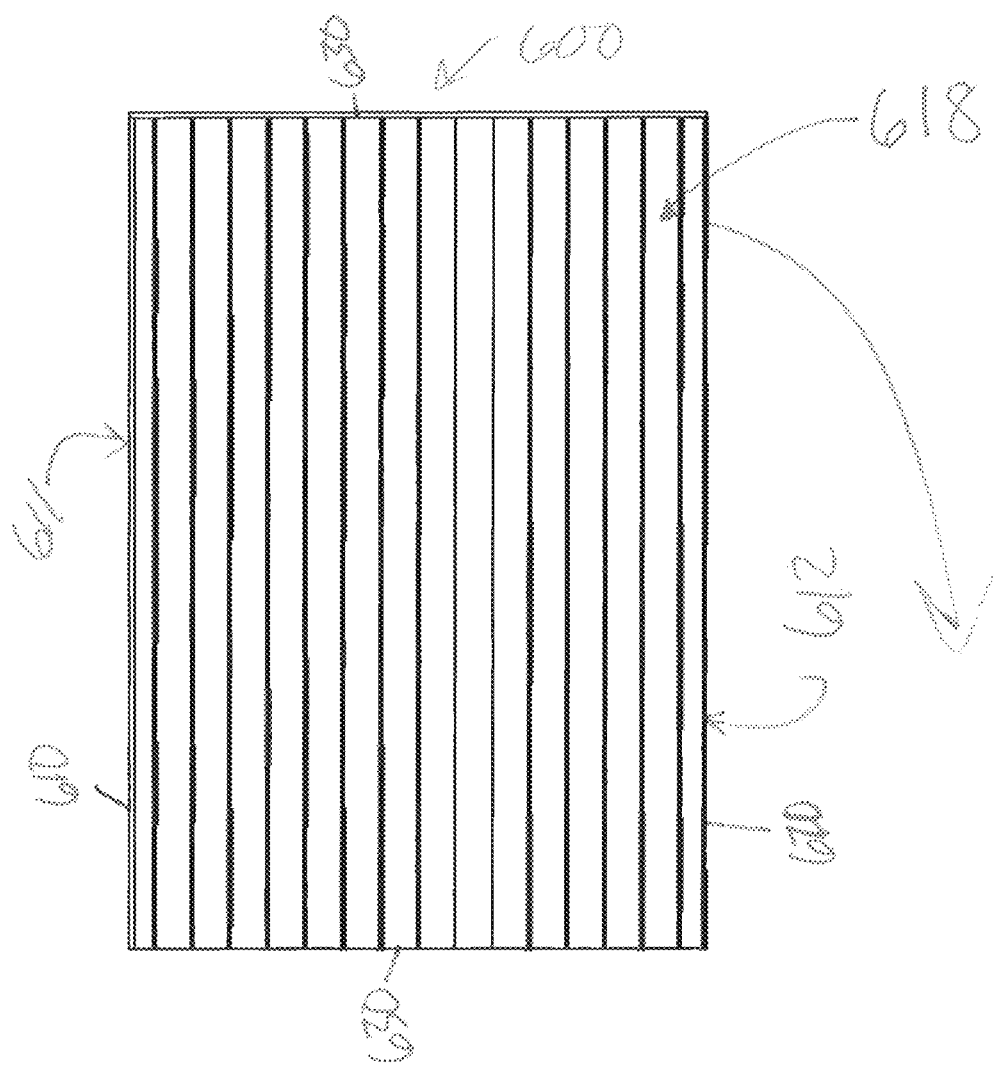

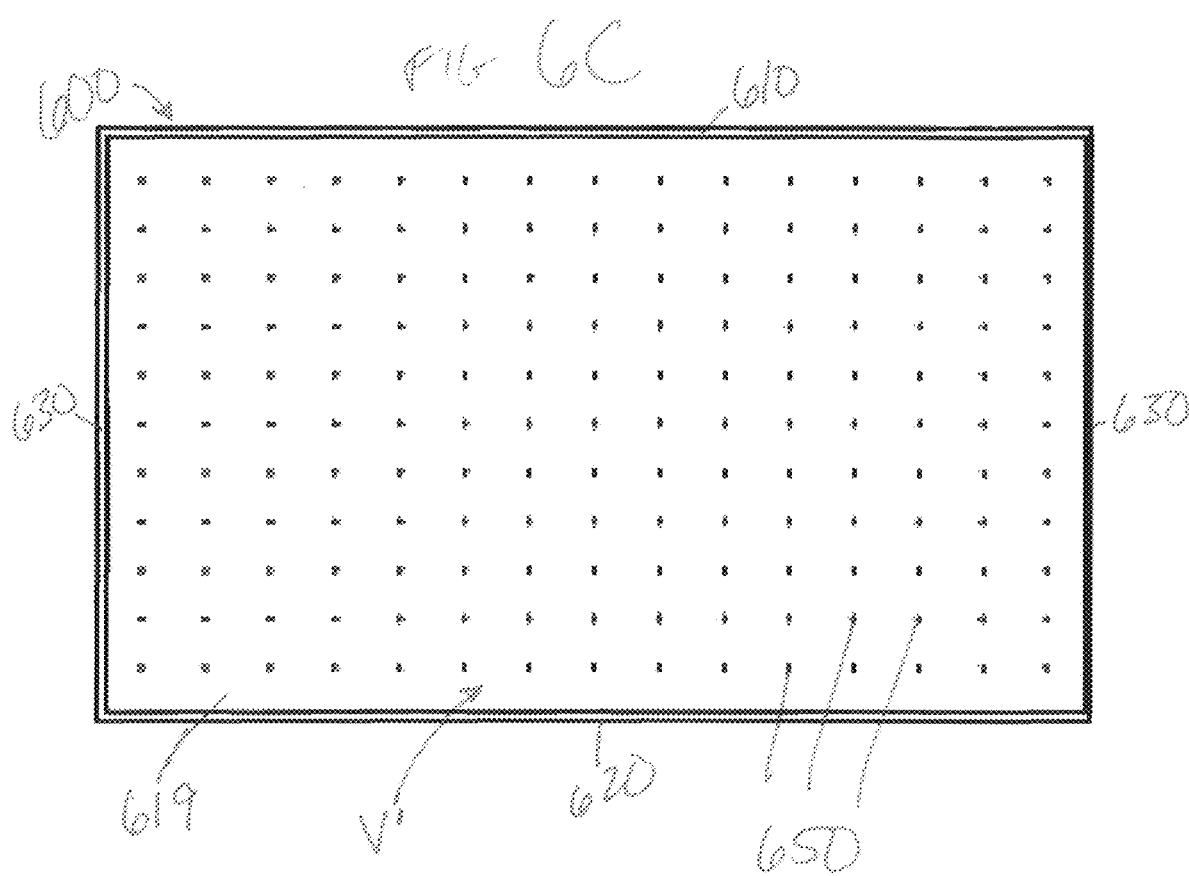

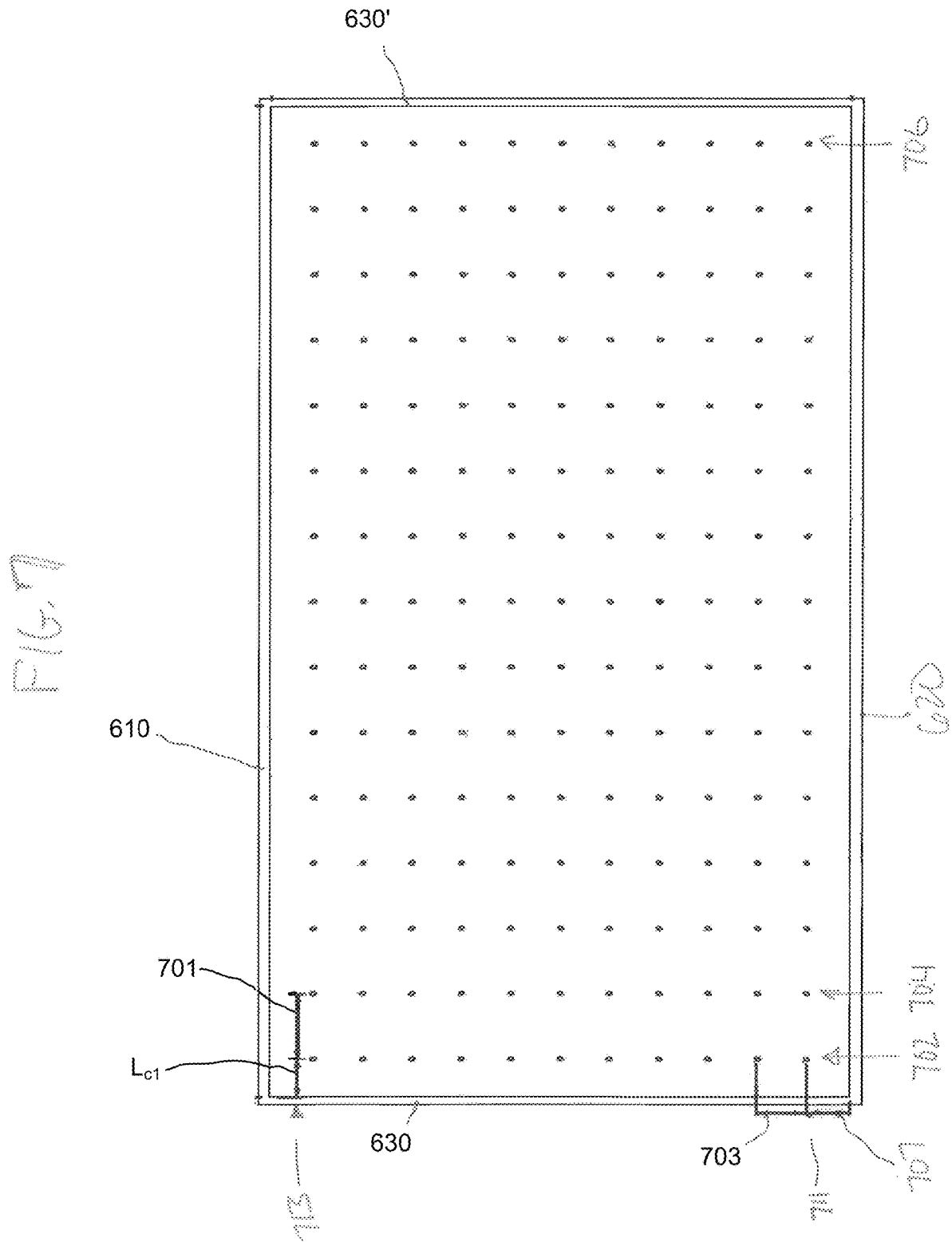

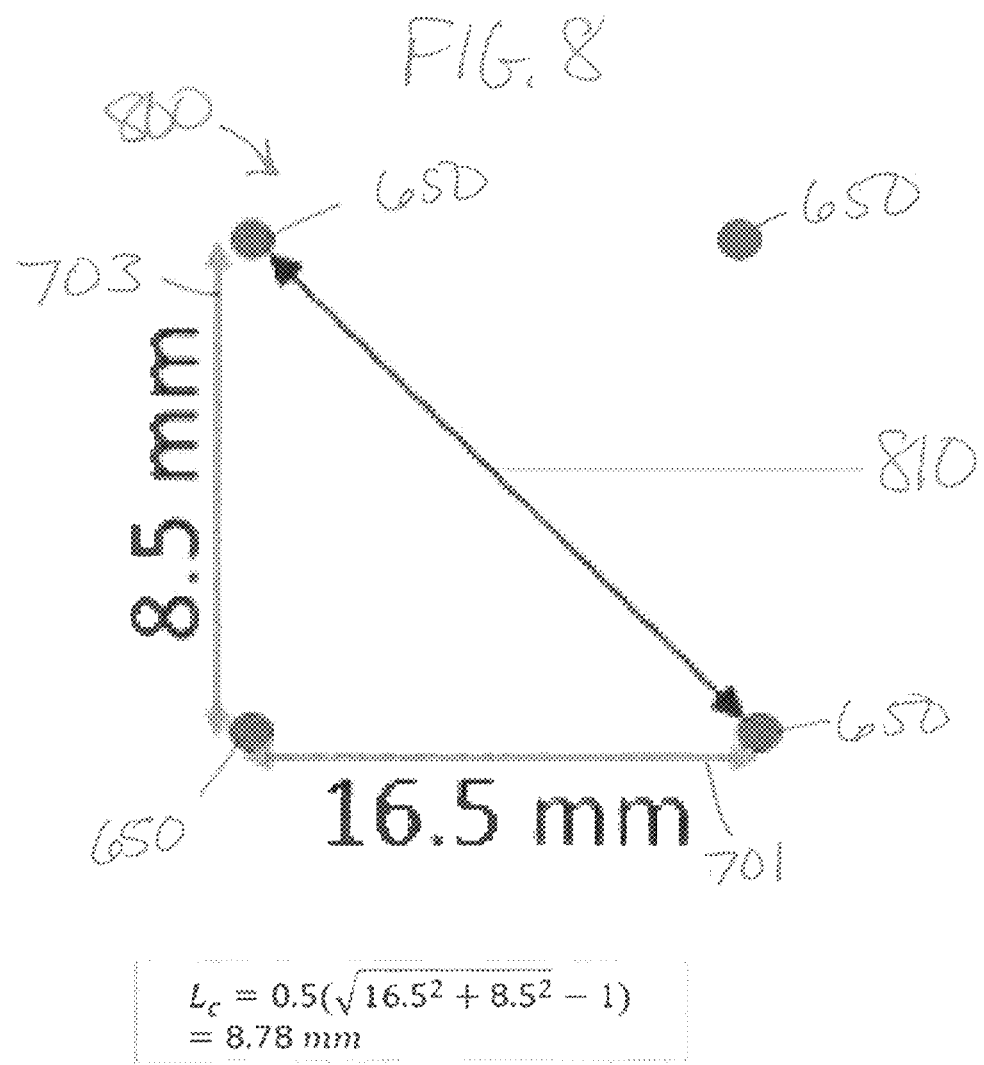

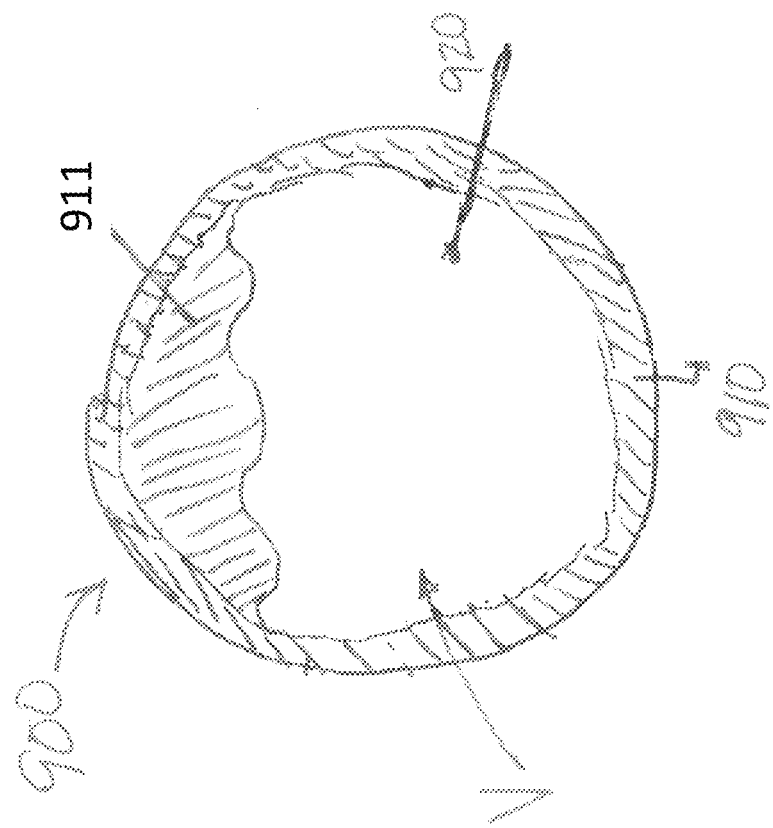

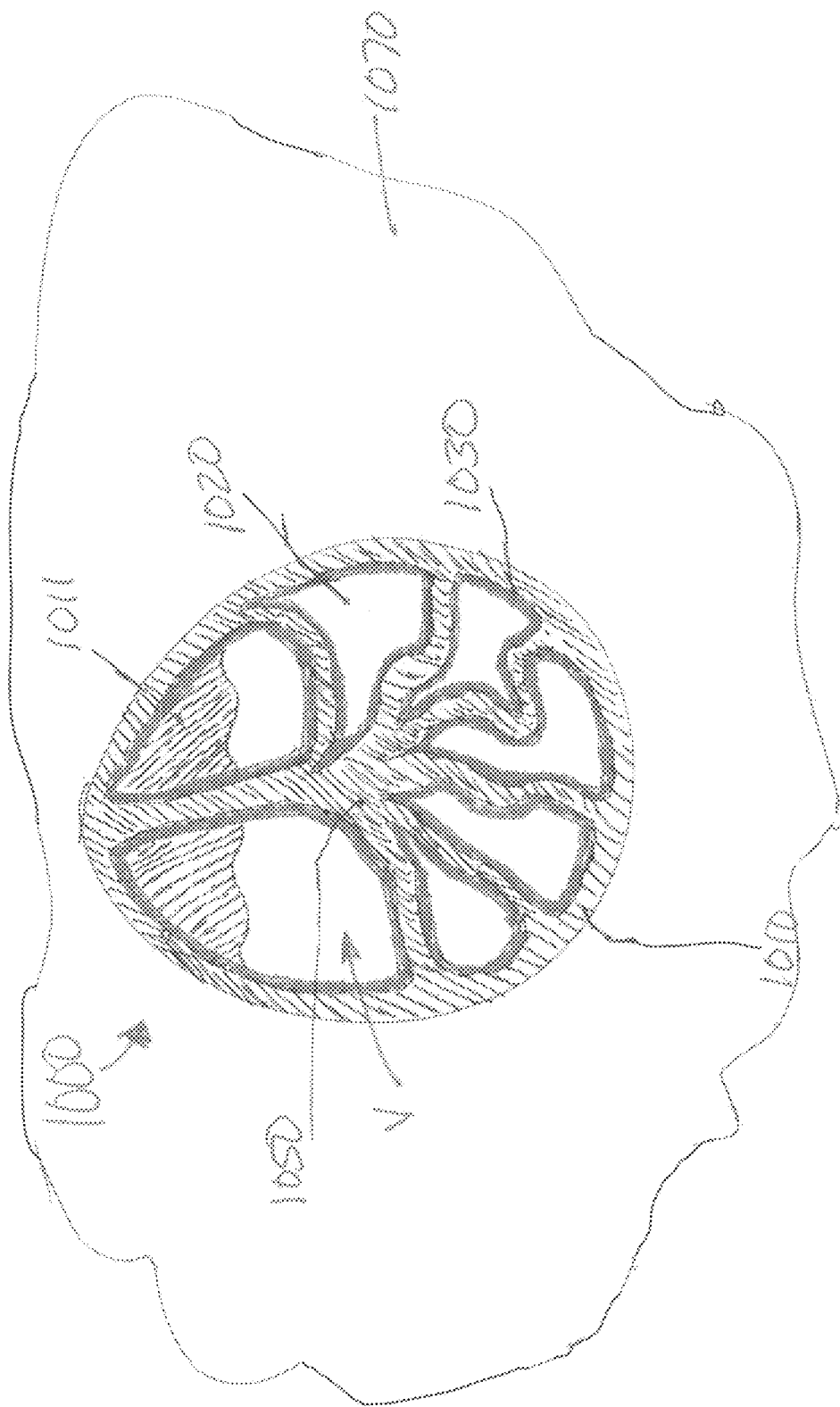

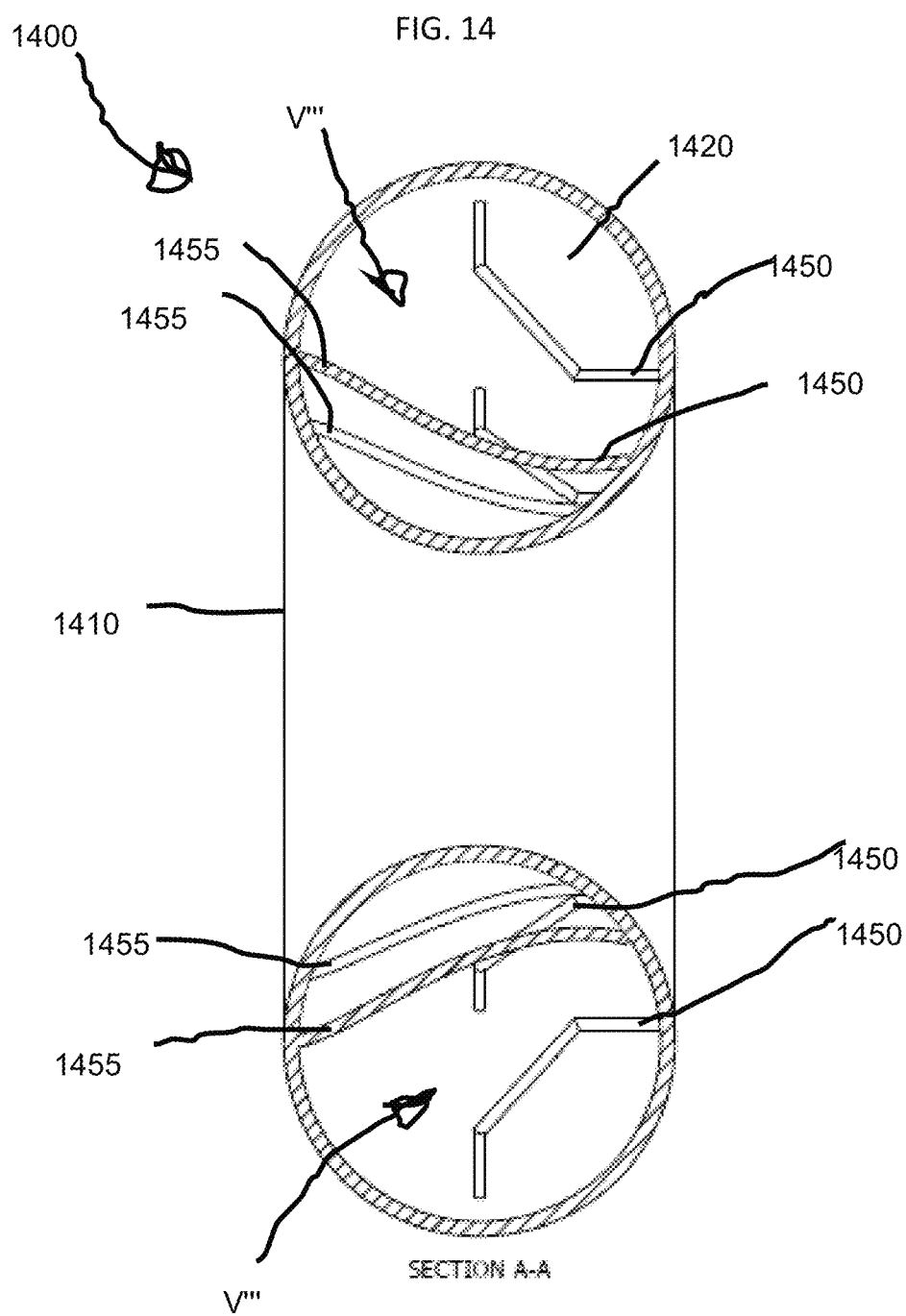

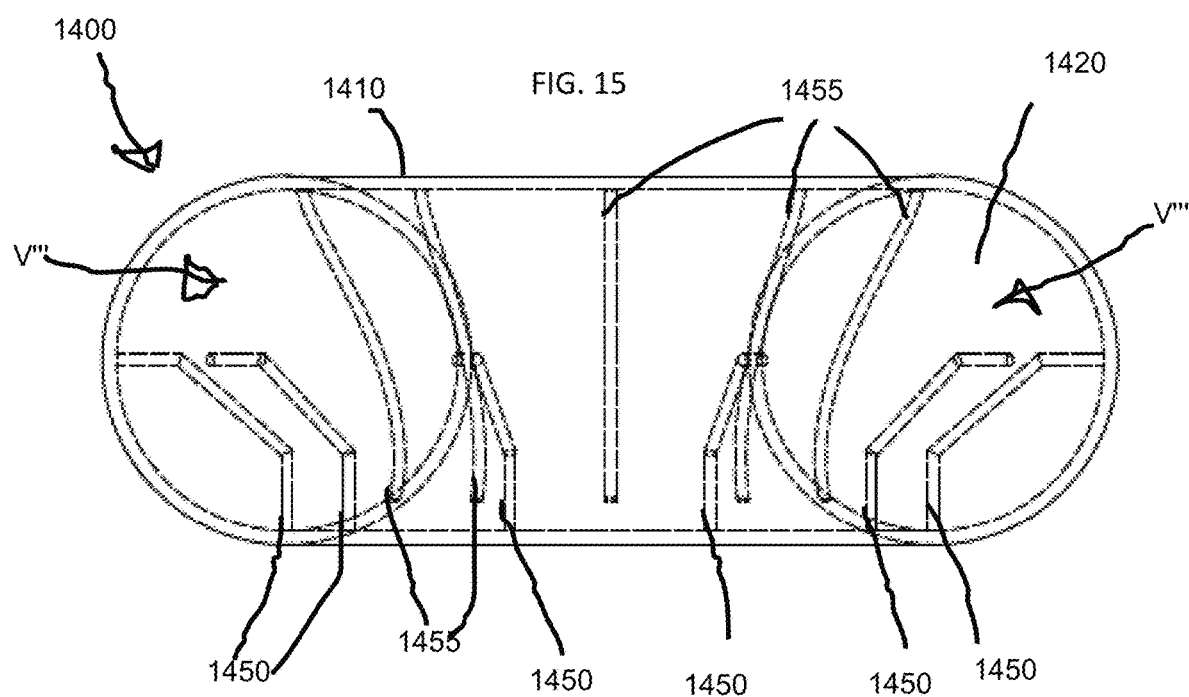

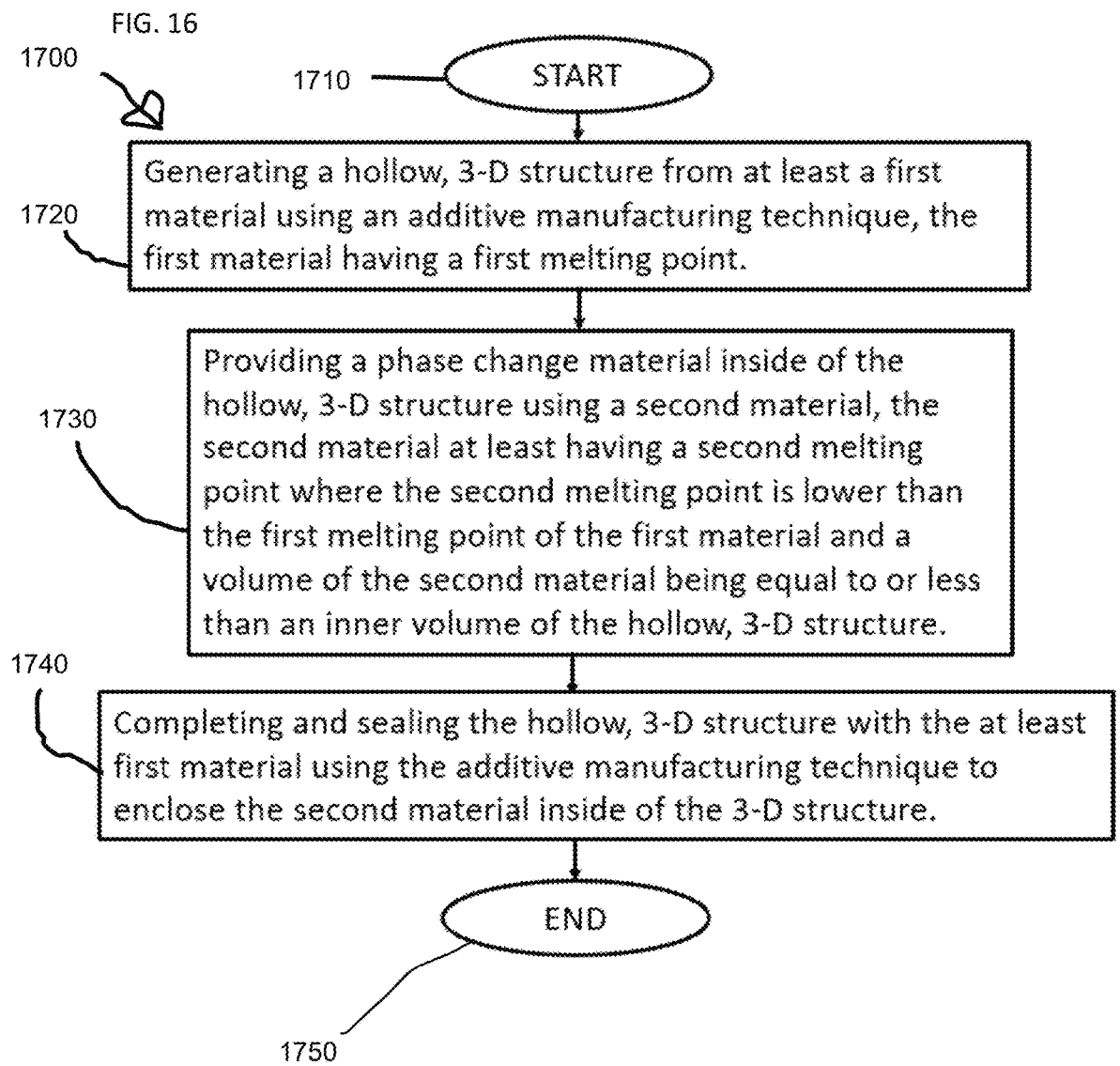

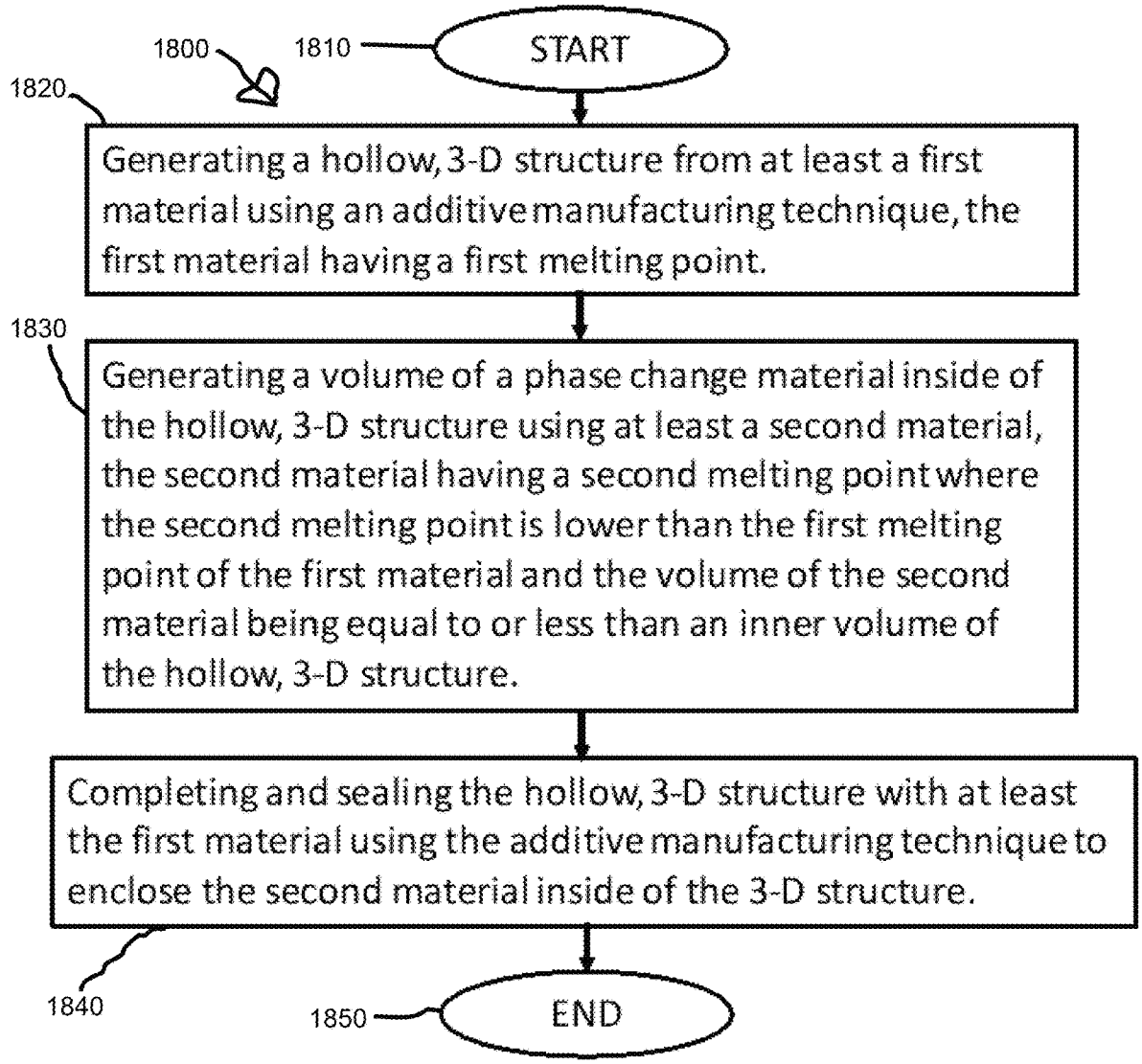

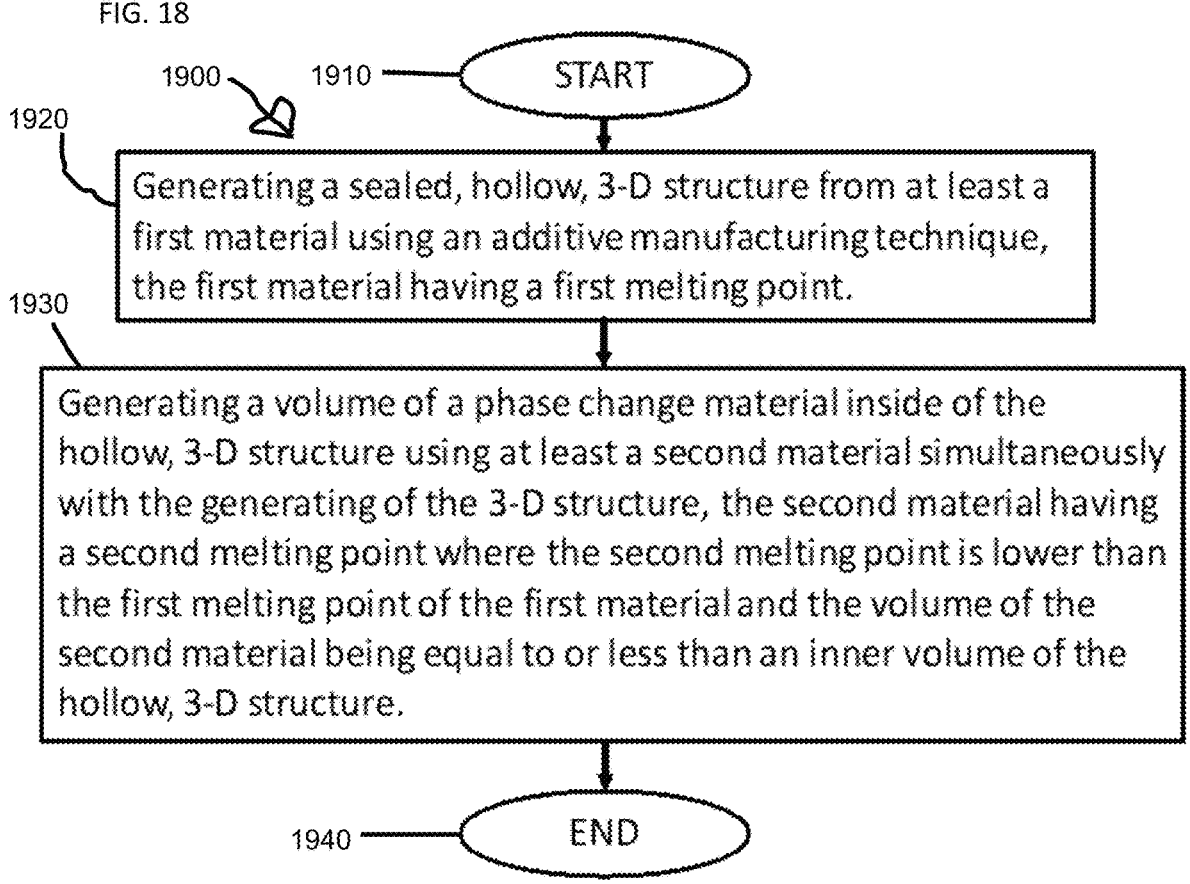

TUNED INTRICATE INTERNAL DISTRIBUTIONS OF MATERIAL AND GEOMETRY USING, IN WHOLE OR IN PART, ADDITIVE MANUFACTURING TECHNOLOGIES AND APPLICATIONS THEREOF TO METHODS, SYSTEMS, APPARATUSES FOR ATTENUATION SOLIDIFICATION TIME OF ENCAPSULATED PHASE CHANGE MATERIALS

TECHNICAL AREA

Phase change materials (PCM) that are used for temporary thermal energy storage (TES), and, more particularly, encapsulated PCM (ePCM) where the encapsulated material can include one or more different materials, each with melting points that are higher than the PCM and which is created in whole or in part using a variety of different additive manufacturing technologies.

BACKGROUND

Phase change materials (PCM) are used for temporary thermal energy storage (TES) by latent heat. When a phase change material is encapsulated, it will be referred to as a encapsulated PCM (ePCM), and when the ePCM capsules/containers are incorporated with, or as part of, a heat exchanger, referred to as a latent heat thermal energy storage system (LHTES), for the remainder of the document. The ePCM is held within a capsule/container. The terms capsule and container can be used interchangeably. LHTES are applied in two areas: thermal storage for cold or hot applications. Applications of temporary cold storage can include, but are not limited to, refrigeration and HVAC systems, while hot storage applications include, but are not limited to, thermoelectric power plants, industrial applications using waste heat, and storing unused heat in nuclear energy and concentrated solar power applications. Note that phase change media can also be used for thermal inertia type applications (see, Belen Zalba, Jose Ma Marin, Luisa F Cabeza, and Harald Mehling. Review on thermal energy storage with phase change: materials, heat transfer analysis and applications. *Applied thermal engineering*, 23(3):251-283, 2003). Heat exchangers in LHTES systems are designed such that the heat transfer fluid works at a set temperature difference window about the melt point of the PCM. For example, the fluid temperature window is PCM melt point + or −10 Degrees, i.e., plus 10 during charge part of the cycle, minus 10 for the discharge part of the cycle. The solidification time during the discharge part of the cycle can be decreased by allowing the heat transfer fluid to come in at lower temperatures, e.g., PCM melt point minus 25 degrees.

The Department of Energy has been analyzing different types of technologies in CSP, and has noted that thermal energy storage is an efficient way to decrease the cost of electricity (see, Department of Energy. *SunShot Vision Study February* 2012 (*Chapter* 5). 2012). The Department of Energy has been researching various CSP Technologies as well as future research goals and certain other applications still have active ongoing research (see, Id. and https://www.nrel.gov/csp/materials-science.html). Benefits of LHTES include increased storage density and the phase change process being isothermal, or relatively isothermal. In CSP electricity generation applications, an idealized LHTES can provide: 1) high storage capacity, 2) low charging and discharging times, and 3) economically feasible scalability to different storage sizes. However, prior art systems have difficulty providing economically feasible scalability to different storage sizes. Charge time refers to the time it takes to melt the phase change media, by which energy is stored in the medium for later use. Discharge time refers to the time it takes to solidify the phase change media, by which prior stored energy is extracted. LHTES address the high storage capacity, while research is still being conducted for low charging and discharging times. The application of various technologies is limited by the economic feasible scalability of the technology to different storage sizes. Prior pathways of research have opted to meet the second goal by encapsulating the PCM. What is needed is an encapsulated geometry that has a higher surface area to enclosed volume ratio.

A limiting factor of latent heats storage systems is the discharging process, which is a solidification process. ePCM containers usually solidify from the outside in because the heat is pulled from the outer surface of the enclosed volume. Solidification is a conduction-dominated heat transfer process. Due to this, as the solid PCM layer thickens, the heat transfer rate decreases, this is attributed to the increase in thermal resistance due to the solid layer itself. The solidification time may be an order of magnitude or more higher than the melt time for a given size (see, Section 3.3.3 of Ali F Elmozughi. *Heat Transfer Analysis of Encapsulated Phase Change Materials for Thermal Energy Storage*. Lehigh University, 2014). This has an impact regarding picking the geometry of the enclosed volume. Generally larger capsules hold more energy, but take longer to solidify fully and the increase in solidification time can be nonlinear with respect to their size increases.

The effect of the solidification process (discharge part of the charge-discharge cycle) will be discussed next. In CSP, the charge-discharge cycle that the PCM mass undergoes would ideally be done on a daily basis, or even higher frequency. Shorter charge-discharge cycles are economically beneficial because they allow higher rates of return on investment. Generally a spherical capsule is picked because it has a high surface area to volume ratio compared to other geometries. The downside is that the solidification time of spheres can have a high sensitivity with respect to the diameter of the sphere (see, A Felix Regin, S C Solanki, and J S Saini. An analysis of a packed bed latent heat thermal energy storage system using pcm capsules: Numerical investigation. *Renewable Energy*, 34(7):1765-1773, 2009; also see, page 117 of Harald Mehling and Luisa F Cabeza. *Heat and cold storage with PCM: An up to date introduction into basics and applications*. Springer Science & Business Media, 2008). The implication of large solidification times for one sphere is straightforward but it compounds on itself when used in a packed bed storage system. For example, while the entire packed bed may melt within 6 hours, only about 50% or lower may solidify in the same time. Obviously this has implications regarding the amount of mass that went through a charge-discharge cycle within a given time. For example, suppose the PCM mass requires 100 Cycles to be economically comparable to conventional energy; if only half the mass actually undergoes full charge-discharge cycles, then 200 Cycles are required for that mass to be economically comparable to conventional energy, while the excess can be seen as redundant system cost. Note that these implications are with respect to the amount of mass in the TES system, which is not dependent on the encapsulation geometry or technique. The solidification time creates a bound on the rate of energy extraction from TES systems. For example, suppose a TES system has a demand for 1,000 kilowatt-hours of energy. If an application requires a throughput rate of 2000 kilowatts, this would require extraction of 1000 kilowatt-hours in 30 minutes. Unfortunately, prior art encapsulation methods do not address gearing the ePCM mass for a desired solidification rate in an economically scalable manner.

Regarding attenuating solidification time of an ePCM, current systems are limited to: 1) increasing/decreasing the size of the PCM capsule; or 2) inclusion of additives within the PCM to enhance conduction heat transfer. The selection of capsule size and geometry has consequences on the capital cost of the TES system. For example, if the ePCM capsules are used in a packed bed heat exchanger, then the pressure drop of the packed bed is dependent on the size of the capsules. This would mean that larger capsules can be preferred since it would decrease the pressure drop, pumping requirements and associated costs.

On the other hand, larger capsules, encapsulated using conventional methods, entail larger solidification times. A second drawback relates to the implications on manufacturing volume. For example, small ePCM capsules require a larger manufacturing volume for a given TES system size. As a result, this creates constraints on the scalability of prior art encapsulation technologies. Inclusion of additives in the PCM creates additional requirements to be met during design and manufacturing, because it can increase PCM cost and requires any additives to be chemically inert to the PCM. Specifically, the additives cannot deteriorate, nor change the PCM's thermo physical properties, during repetitive thermal cycling. In addition, the spatial distribution of these additives in the PCM can be augmented during thermal cycling. For example, upon repeated melting and solidification, the additives may settle preferentially due to gravity or redistribute themselves in a way that mitigates their original purpose.

BRIEF DESCRIPTION OF THE DRAWINGS

Non-limiting and non-exhaustive embodiments of the disclosed subject matter are described with reference to the following figures, wherein like reference numerals and/or indicia refer to like parts throughout the various views unless otherwise precisely specified.

In the following drawings, like reference numerals generally indicate identical, functionally similar, and/or structurally similar elements. The left most digits in the corresponding reference numeral indicate the drawing in which an element first appears.

FIG. 4 illustrates a close-up side view of the rectangular box of FIG. 3A with the internal geometry of encapsulation material, according to an exemplary embodiment of the disclosed subject matter.

FIG. 6A illustrates a perspective view of a rectangular box with a 3D internal rectangular volume with a substantially equally dispersed internal geometry of encapsulation material, according to an exemplary embodiment of the disclosed subject matter.

FIG. 6B illustrates the side view of the rectangular box of FIG. 6A showing the lengths of the substantially equally dispersed internal geometry of encapsulation material, according to an exemplary embodiment of the disclosed subject matter.

FIG. 6C illustrates the side view of the rectangular box of FIG. 6A showing the diameters of the substantially equally dispersed internal geometry of encapsulation material, according to an exemplary embodiment of the disclosed subject matter.

FIG. 7 illustrates a close-up side view of the rectangular box of FIG. 6C with the substantially equally dispersed internal geometry of encapsulation material, according to an exemplary embodiment of the disclosed subject matter.

FIG. 8 illustrates a close-up view of inter rod spacing in the rectangular box of FIG. 6A, according to an exemplary embodiment of the disclosed subject matter.

FIG. 9 illustrates a cross-sectional view of a substantially spherical ePCM without any internal geometry of encapsulation material, according to an exemplary embodiment of the disclosed subject matter.

FIG. 10 illustrates a cross-sectional view of a substantially spherical ePCM with a branching internal geometry of encapsulation material, according to an exemplary embodiment of the disclosed subject matter.

FIG. 14 illustrates a cross-sectional view of the substantially annular ring or ring torus shaped ePCM of FIG. 13 along line A-A with the plurality of spaced internal structures of encapsulation material located within the internal volume of the annular ring or ring torus shaped ePCM, according to an exemplary embodiment of the disclosed subject matter.

FIG. 15 illustrates the cross-sectional view of the substantially annular ring or ring torus shaped ePCM of FIG. 14 without surface shading to show the internal structure of the plurality of spaced internal structures of encapsulation material located within the internal volume of the annular ring or ring torus shaped ePCM, according to an exemplary embodiment of the disclosed subject matter.

FIG. 16 illustrates a flow diagram of a method of manufacturing an encapsulated phase change material, in accordance with an exemplary embodiment of the disclosed subject matter.

FIG. 17 illustrates a flow diagram of a method of manufacturing an encapsulated phase change material, in accordance with another exemplary embodiment of the disclosed subject matter.

FIG. 18 illustrates a flow diagram of a method of manufacturing an encapsulated phase change material, in accordance with yet another exemplary embodiment of the disclosed subject matter.

DETAILED DESCRIPTION

Figure 1:
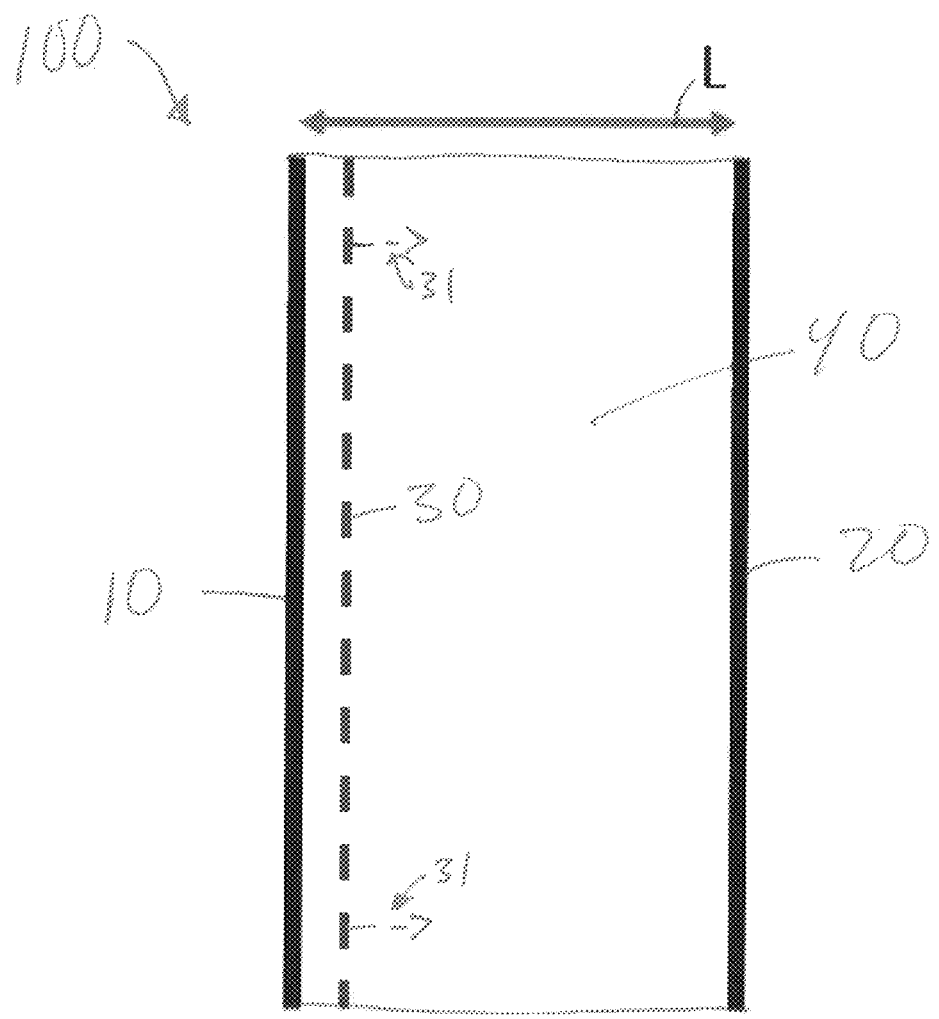
FIG. 1 illustrates a characteristic length scale, L, between plane walls, specifically, a front wall and a back wall, of a capsule illustrating a solidification example of an encapsulated PCM (ePCM) within the capsule, according to an exemplary embodiment of the disclosed subject matter.

An embodiment of the disclosed subject matter's method targets the creation of an encapsulating capsule with a tuned internal geometry, if required, of capsule material around a PCM and a solidification process of the ePCM within the capsule. Specifically, the tuned internal geometry distribution causes a decrease in the characteristic solidification length scale to decrease the solidification time. Various tuned internal geometries can be utilized to create a specified solidification characteristic length scale. Therefore, the presently disclosed subject matter permits alternative internal designs of single capsule shape with various solidification times. This creates the flexibility, for a given mass of ePCM, to tailor the capsule and internal design for different heat extraction rates. Therefore, embodiments of the presently disclosed subject matter effectively decouple capsule size from solidification time. As a result, the presently disclosed subject matter's attenuation method is repeatable and independent of thermal cycling. It is noted that the tuned internal geometries for varying extraction rates, i.e., solidification rates, may not be required, if needed, to be dependent on the LHTES application's working temperature interval undergone by the heat transfer fluid.

The presently disclosed subject matter utilizes the benefits derived from additive manufacturing technologies. The general idea of these technologies is to take a complex three dimensional object and manufacture it by "printing" 2D slices and building the 3D object layer by layer. Unlike conventional technologies, additive manufacturing allows the creation of external geometries and internal geometries simultaneously where the internal geometry is very complex. However, the presently disclosed subject matter is not bound to current developments within the additive manufacturing technologies. The presently disclosed subject matter's method improves upon prior art encapsulation systems due to the following derived benefits of additive manufacturing: printing non-conventional geometries, printing under vacuum-type conditions, material combination flexibility, physical size scalability, printing multi-layered materials, printing functionally graded materials, printing parts with complex internal geometry, printing parts with complex internal passages, and printing a closed capsule/container without any seams or seated openings. The additive manufacturing method used, number of encapsulation layers, and materials involved are determined by application, economic constraints, and desired solidification time (e.g., thermal energy extraction rate).

This has important implications with respect to the capital cost of the overall thermal energy storage system. For example if the capsules are used in a packed bed heat exchanger, then the pressure drop of the pack bed is dependent on the size of the capsules. This would mean that larger capsules may be preferred since it would decrease the pressure drop and pumping requirements and associated costs. Note that the internal geometry could be represented as a set of fins extending, for example, but not limited to, inwardly from an inner surface of the capsule, if the internal geometry doesn't intersect with itself. However, this may not be optimum because the conduction heat transfer solidification process is sensitive to the temperature distribution on the external surface of the capsule. Therefore, the geometries that start at the intersection of the interior wall may be preferred to intersect at some point within the phase change material. There may be a plurality of intersections, or only one, for example, but not limited to the geometrical center of the capsule.

Additive manufacturing technologies allow for the creation of small features/thicknesses. This is beneficial for ePCM because the thickness of an internal geometry can be small as compared to the container/capsule macroscopic dimensions. For example, generally, the internal geometry will not take up a majority of the interior volume of the container/capsule, but instead will allow a substantial increase in the internal surface area. The benefit of this is that it allows for increased heat transfer. These technologies allow for the creation of complex internal passages. This is beneficial because, for example, but not limited to, it allows a heat exchanger's heat transfer fluid to permeate through the capsule/container without contacting the ePCM. In other words, the overall heat transfer rate can be increased by permeation of the heat transfer fluid and increase in internal surface area. In addition, this can affect internal temperature variation within PCM to help mitigate phase separation for PCMs that exhibit incongruent melting. The side benefit is that the overall pressure drop of the heat exchanger can be reduced, which is especially true if the application uses a packed bed heat exchanger.

In addition to varied heat extraction rates, additive manufacturing allows the capsule/container to be contiguous, without seams. This is important to prevent internal mass leaking out, and external heat transfer fluid, from leaking in when in use. Since the container operates within a temperature interval, differences in thermal expansion coefficients between PCM and the container's material(s) can cause joints/seams made using conventional prior art encapsulation methods to open after multiple uses. Specifically, in prior art containers that are created from two pieces and use a third material to join/weld the two parts, the joint/seam/seal formed between the two pieces can be compromised by repeated heating and cooling cycles. For example, economic life-cycle analysis may require ePCMs used in LHTES in electric utility applications to last 20 years commensurate with a charge-discharge cycle at least 1-2 times a day. As a result, this means that the ePCM is expected to undergo 7,000-15,000+ thermal cycles during its life without container and PCM deterioration.

Additive manufacturing also allows additives to be placed within the encapsulating material, which will allow prescribed enhancement of thermal properties such as thermal conductivity. In other words, the additives are present within the container/capsule itself as opposed to being incorporated within the PCM. Additive manufacturing technologies allow for straightforward control of spatial distribution of additives within the container/capsule wall. These additives can also be used for enhancing radiative heat transfer. Note, incorporating additives in this manner will not degrade upon thermal cycling since that is the capsule/container's purpose.

Another benefit is that some additive manufacturing technologies incorporate a vacuum. This is beneficial for ePCM because some PCMs undergo a density change upon phase change. For example, salts expand upon melting and water expands upon freezing. Therefore, the container must account for this and incorporate a void to accommodate the volumetric changes. If a gas is present in that void, it will be compressed and heated upon melting of the PCM. This will create an increase in internal pressure, which the container/capsule will have to withstand. If the PCM has a low vapor pressure, like a metal or salt, then additive manufacturing technologies that use a vacuum can be used. In doing so, the internal pressure increase is minimized. This may translate to a decrease in container/capsule cost since the internal mechanical stresses it must withstand are mitigated. On the other hand, certain operational/environmental characteristics would require the capsule/container to be made of a higher strength material or require the container/capsule to have a thicker wall of a lower strength material. Note that the route of withstanding internal pressure with a thicker wall would also translate to an increased conduction thermal resistance.

Therefore, the general question that the presently disclosed subject matter addresses is as follows: given a mass of phase change material and mass of encapsulation material, what would be the optimum distribution of the internal geometry that connects the outside surface to the inside with the least amount of encapsulation mass, but increases the internal surface contact area between the phase change material and the encapsulation container to give a prescribed solidification time, which is commensurate with requiring that the encapsulation capsule/container be contiguous, e.g., does not have joints or seams across the thickness of wall of the container, while providing internal void, if needed, for volumetric expansion during phase transition? It is important to note that the time target is with respect to mass, regardless of capsule geometry. To put it another way, for example, internal geometry can be tuned and included in a 4-inch diameter spherical ePCM such that the augmented solidification rate (due to internal geometry) allows it to have a similar solidification time to a 3-inch diameter spherical ePCM without internal geometry. Also, for example, internal geometry can be tuned and included in a 4 inch diameter spherical ePCM such that the augmented solidification rate (due to internal geometry) allows it to have a similar solidification time to a 2 inch diameter cylindrical ePCM (of a given aspect ratio) without internal geometry.

Current encapsulation methods employ two routes: 1) creating the encapsulation around the PCM; or 2) creating the encapsulation and putting the PCM in part way, then finishing the encapsulation. While embodiments of the presently disclosed subject matter can employ both methods, the latter method can be done faster and at a lower cost, because the internal geometries used can be complex, which can make the use of the first method more time consuming and expensive. In addition, additive manufacturing technologies allow for a third method, which is to print the encapsulation and PCM in situ simultaneously, which, in general, current systems do not do. Additive manufacturing is flexible enough to print capsule geometries designed for an application's solidification time and heat exchanger. While conventional capsule geometries can be used, additive manufacturing also allows for encapsulation in non-conventional geometries.

Additive manufacturing allows creation of complex geometries of multi-layered materials. The purpose of layers (or material gradation) can be for enhanced capsule life. For example, a protective layer can be on the inside or the outside of the primary casing material or on both sides of the primary casing material. The reason to include the protective layer can depend on the application. For example, if the PCM and casing material are metals, the purpose of the protective layer is to prevent dissolution, for example, the encapsulating material could be copper while the PCM is tin. Note, the protective layer may not be required if the protective layer and PCM materials used contain an immiscibility region in the phase diagram in an application temperature interval. Another reason to include a protection layer could be for preventing corrosion, for example, the encapsulating material is a metal while the PCM is a molten salt that corrodes or otherwise degrades the metal encapsulating material. Additive manufacturing technologies allow for straightforward implementation of the protective layer, on one or both sides of the primary encapsulation material. For example, consider an application in nuclear energy, where the PCM and the heat transfer fluid of the application are both molten salts. In this example, assuming the primary encapsulating material is a metal, protective layers would need to exist on both the inside and the outside of the primary casing. Further, the LHTES end-use application stipulates the economic/scalability requirements and temperature interval. The temperature stipulates candidates for the PCM material, which helps identify the candidates for use as the container materials and, if needed, a protective layer material, with economics in mind. Non-limiting examples for candidate materials that may be used as the protective layer include: basalt, stone/mineral/glass wool, aluminum oxide, zirconium oxide, materials composed of silicate or aluminosilicate minerals, non-oxide ceramics like silicon carbide or aluminum nitride, glass, vitreous enamel/glaze, salt glaze, and even alloys like steels with resistance to corrosion or element diffusion/dissolution. In fact, if the LHTES end-use temperature is low enough, polymers may be included as candidates for protective materials.

Additive manufacturing technologies also have given the option of utilizing functionally graded materials, which allow the encapsulating material thickness of a casing to be composed of one "layer" rather than multiple layers. In other words, the single layer is composed of a gradation of multiple materials, rather than distinct material layers. This one casing "layer" is functionally graded to be protective on both the inside and the outside while being another material in the middle. With this in mind, additive manufacturing technologies allow for straightforward variations in casing material combinations as required. In addition, these technologies are economically scalable to larger capsule sizes, without the drawback of increased solidification times. The implication is smaller manufacturing volume for a given TES system size. For example, a TES system with a capacity of 2000 kilowatt-hours would require 2000 1 watt-hour capsules, or 50 400 watt-hour capsules. The 400 watt-hour capsules would be larger in size, but without the increased solidification time due to the internal geometry. Note that the solidification time is not bound to a specific capsule/container geometry. The internal geometry distribution can be tailored for different capsule geometries to solidify in similar times (for example, torus, sphere, cylinder, etc. capsule geometries). The requirement of a functionally graded encapsulation, or multi-layered encapsulation, will depend on the application. For functionally graded walls by additive manufacturing, it is important to note that one of the materials listed previously (or a varying combination of materials) may also be incorporated within the container wall with directionally-oriented increasing proportion across the wall thickness such that a distinct protective layer is not required.

An internal geometry provides another benefit, which is to mitigate the temperature gradients on the capsule/container surface. Since the primary mode of heat transfer is conduction, it is sensitive to the spatial distributions of temperature and temperature gradients. Therefore, the internal geometries that start at an intersection with the interior wall and end at an intersection with the interior wall, at a separate location and without intersecting within the PCM, may be preferred to other internal geometries that start at the intersection of an interior wall and intersect at some point within the phase change material. There can be a plurality of intersections, or only one, for example, but not limited to, at the geometrical center of the capsule. The internal geometry acts as thermal conduits to make up for temperature distributions on the external surface of the capsule. Put in other words, the capsule may be put into a storage system where the heat transfer fluid enters from one direction and leaves from another. During the discharge part of the cycle, this would put a direction dependent temperature distribution of cold temperature on one side of the capsule surface. As a result, it would take longer for the given capsule to solidify fully since the surface area of the cold temperature is less than the total external surface area. In this situation, the solidification time can be decreased if one side of the capsule is connected to another side or to a plurality of other sides of the capsule to help even out the overall temperature distribution and allow the capsule to solidify from the outside in and the inside out simultaneously. This can cause an overall decrease in the capsule solidification time, for a given ePCM mass, as compared to the solidification time without any internal geometry. Note that, in some embodiments of the disclosed subject matter, the internal geometry may not self-intersect, if the application requires.

FIG. 1 illustrates a characteristic length scale, L, between plane walls, specifically, a front or left wall 110 and a back or right wall 120, of a capsule 100 illustrating a solidification example of an encapsulated PCM within the capsule 100, according to an exemplary embodiment of the disclosed subject matter. Although the capsule 100 is shown in cross-section to have a substantially rectangular shape for illustrative purposes, the capsule 100 can have any shape in which a PCM may be contained. In FIG. 1, the two opposing walls 110, 120 are a distance L apart and a liquid PCM 400 is contained between the walls 110, 120. The left wall 110 is kept at a temperature below the melting temperature of the PCM. A solidification front (dashed line) 130 is shown by the broken arrows 131 as propagating from the left wall 110 toward the right wall 120. A characteristic length scale, $L_c$, is the separation distance between the two solid walls, where $L_c=L$. The length scale $L_c$ therefore measures the distance parallel to the direction of motion of the solidification front (in other words, the distance the solidification front has to traverse to fully solidify the volume of PCM stored between the walls 110, 120). Alternatively, if solidification fronts start at both walls 110, 120 and propagate toward each other to meet in the center, then, the characteristic length scale would be $L_c=0.5L$. If the solidification front propagation is multi-directional, i.e., in 3 dimensions, then, generally, the characteristic length scale $L_c$ is set equal to the largest distance the front will have to traverse. This allows for a conservative approximation of the associated solidification time. For example, if a height of the capsule was also equal to L, then the end would be a square and the characteristic length scale would also be $L_c=0.5L$.

Therefore, the approximate timescale for the solidification problem can be computed knowing the characteristic length scale $L_c$ and a thermo physical property of the PCM. The thermo physical property that relates the two scales is known as a thermal diffusivity (denoted below as a).

$$t = \frac{L_c^2}{\alpha}$$

For the exemplary calculation of various timescales described herein, the PCM is assumed to be Solar Salt, which is a high purity salt that can achieve a molten state and, generally, is comprised of sodium nitrate ($NaNO_3$) and potassium nitrate ($KNO_3$) in about, although not limited to, a 60/40 mixture, respectively. Available literature generally has correlations for various thermo physical properties (see, e.g., Thomas Bauer, Nils Breidenbach, Nicole Pfleger, Doerte Laing, and M Eckand. Overview of molten salt storage systems and material development for solar thermal power plants. In *Proceedings of the* 2012 *National Solar Conference for* (*SOLAR* 2012), Denver, pages 1-8, 2012; Roberto Serrano-Lo'pez, Jordi Fradera, and Santiago Cuesta-Lo'pez. Molten salts database for energy applications. *Chemical Engineering and Processing: Process Intensification*, 73:87-102, 2013; and Donald A Nissen. Thermophysical properties of the equimolar mixture sodium nitrate-potassium nitrate from 300 to 600 c. *Journal of Chemical and Engineering Data*, 27(3):269-273, 1982.). For simplification and illustration of the present example, the thermal diffusivity and liquid density are approximated as constants from the literature. For example, the heat of fusion for Solar Salt is 161 kJ/kg, the thermal diffusivity, a, is approximated to be of 0.15 mm$^2$/s, and the liquid density is approximated as 1900 kg/m$^3$ (see, https://www.archimedesolarenergy.it/molten salt.htm). In addition, the volume change on fusion is approximated to be about 4.6%.

Figure 2A:
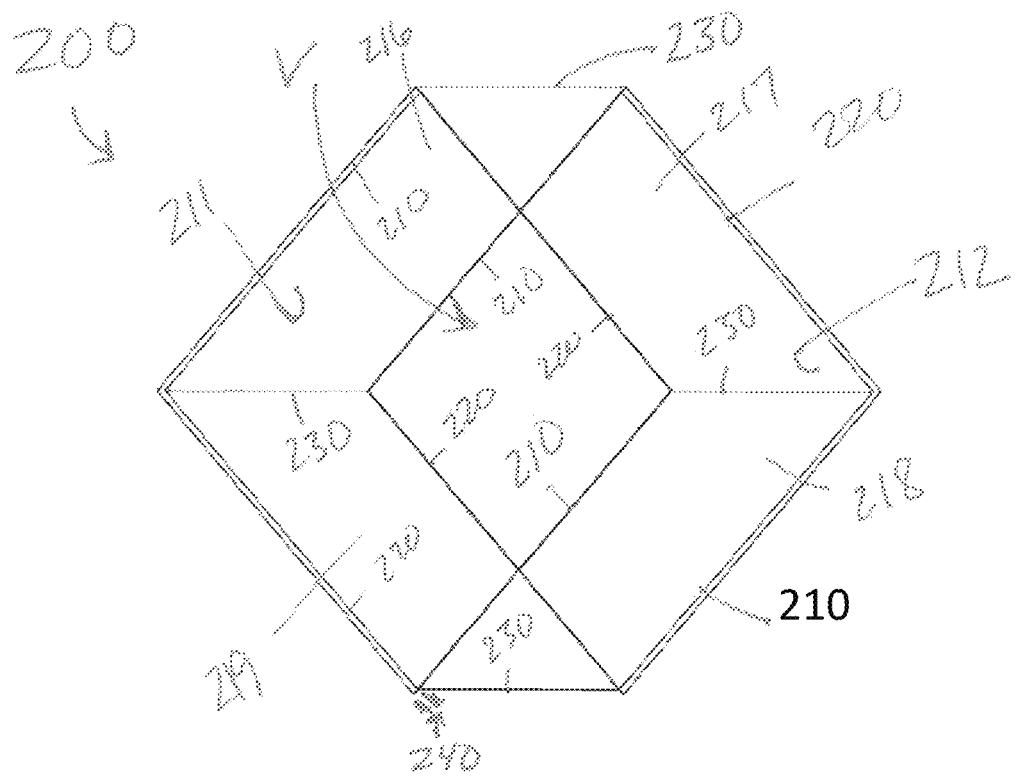
FIG. 2A illustrates a perspective view of a rectangular box with a 3D internal rectangular volume V of the box whose internal dimensions are 100×250×250 mm³, according to an exemplary embodiment of the disclosed subject matter.

FIG. 2A illustrates a perspective view of a rectangular box 200 with a 3D internal rectangular volume V of the box 200 whose internal dimensions are 100×250×250 mm$^3$, according to an exemplary embodiment of the disclosed subject matter. Therefore, the internal rectangular volume V of the rectangular box 200 equals 6,250,000 mm$^3$ or 6,250 cm$^3$.

Figure 2B:
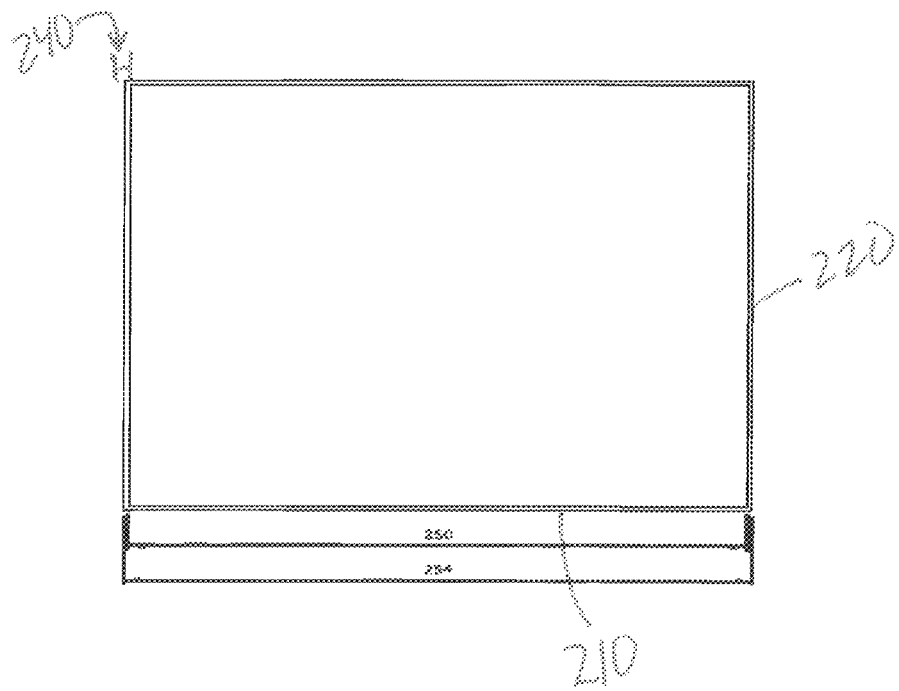
FIGS. 2B-C illustrate a top view and a side view of the rectangular box of FIG. 2A in which the outer dimensions of the rectangular box, i.e., length×width×height, is shown as 104×254×254 mm³, according to an exemplary embodiment of the disclosed subject matter.
Figure 2C:
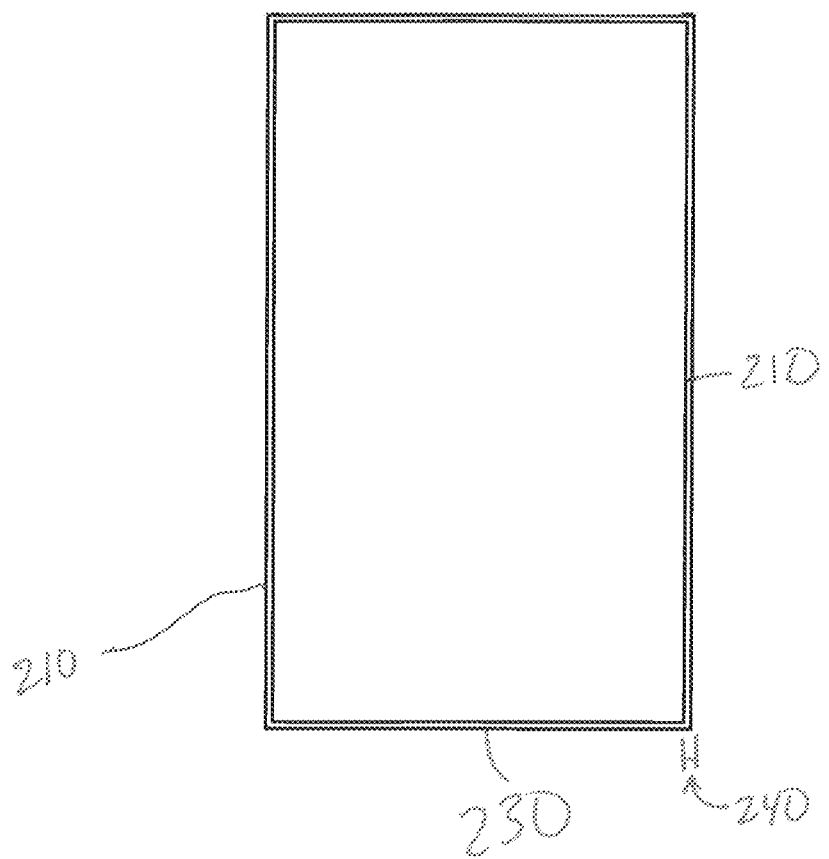

FIGS. 2B-C illustrate a top view and a side view of the rectangular box 200 of FIG. 2A in which the outer dimensions of the rectangular box, i.e., length 210×width 220× height 230, are 104×254×254 mm$^3$, according to an exemplary embodiment of the disclosed subject matter. A top 211 is defined by top edge lengths 210 and top edge widths 220 and a bottom 212 is defined by bottom edge lengths 210 and bottom edge widths 220. Connecting the top 211 and bottom 212 are four sides 216, 217, 218, 219 where two sides 216, 218 are defined by one top edge length 210, one bottom edge length 210 and two height lengths 230, while the other two sides 217, 219 are defined by one top edge length 220, one bottom edge length 220 and two height lengths 230. This example illustrates the effect of internal geometry, and its spatial distribution, on the solidification time of the rectangular box 200 of FIG. 2A, which shows an internal rectangular volume whose dimensions are 100×250×250 mm$^3$, which equals an internal rectangular volume V of 6,250,000 mm$^3$ (or 0.00625 m$^3$) and has an inner surface area of 225,000 mm$^2$. Therefore, the rectangular box 200 has outer dimensions of 104×254×254 mm$^3$, a uniform shell thickness 240 of 2 mm. If 90% of this internal rectangular volume V is reserved for liquid PCM, then the rectangular box 200 can hold 11.875 kg of PCM.

Figure 3A:
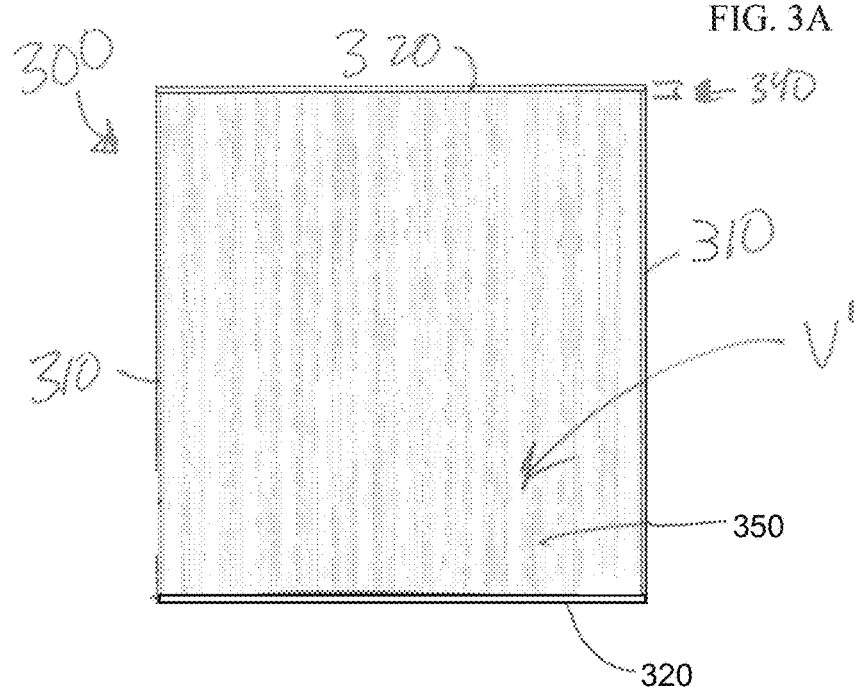
FIG. 3A illustrates a top view of a second rectangular box 300 similar to the rectangular box of FIGS. 2A-2C with similar length, width, height (see FIG. 3B) and a 3D internal rectangular volume, but with an internal geometry of encapsulation material, according to an exemplary embodiment of the disclosed subject matter.

FIG. 3A illustrates a top view of a second rectangular box 300 similar to the rectangular box 200 of FIGS. 2A-2C, but a FIG. 3A, the second rectangular box 300 has a length 310, a width 320, and a height 330 (see FIG. 3B) and a 3D internal rectangular volume V', but with an internal geometry of encapsulation material 350, according to an exemplary embodiment of the disclosed subject matter. For the sake of simplicity, the internal geometry of encapsulation material 350 includes a distribution of 165 cylinders 350, all of which have the same dimensions. Specifically, each cylinder (not separately shown in FIG. 3A, but shown in FIG. 4) has a diameter of 1 mm and a length of 250 mm. Therefore, the volume taken up by the distribution of 165 cylinders 350 is 32,398 mm$^3$, which is 0.5% of internal volume. In addition, the surface area added by the distribution of 165 cylinders 350 is 129,591 mm$^2$, which constitutes a 57% internal area increase.

Figure 3B:
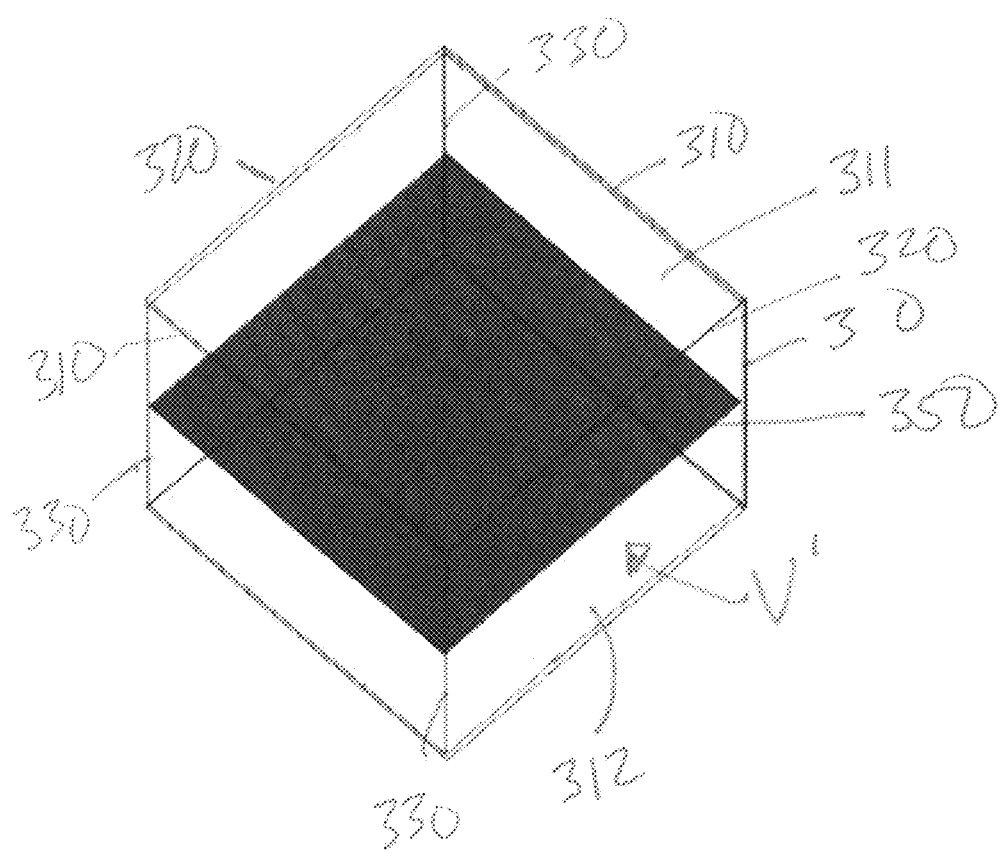
FIG. 3B illustrates a perspective of the second rectangular box of FIG. 3A with the internal geometry of encapsulation material, according to an exemplary embodiment of the disclosed subject matter.

FIG. 3B illustrates a perspective of the second rectangular box 300 of FIG. 3A with the internal geometry of encapsulation material 350, according to an exemplary embodiment of the disclosed subject matter. In FIG. 3B, the internal geometry of encapsulation material 350 is shown to extend across a middle portion of the second rectangular box 300 at about a middle of the height 330 and between the length 310 and the width 320 sides of the second rectangular box 300.

Figure 3C:
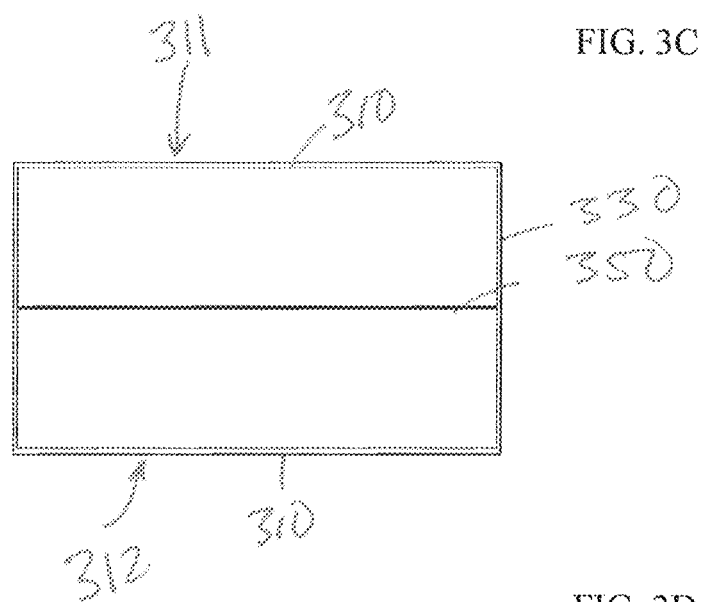
FIGS. 3C-D each illustrates a side view of the rectangular box of FIG. 3A with the internal geometry of encapsulation material in a middle of the height of the rectangular box, according to an exemplary embodiment of the disclosed subject matter.
Figure 3D:
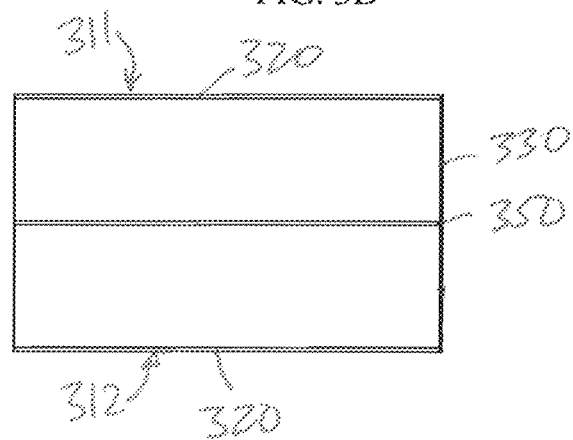

FIGS. 3C-D each illustrates a side view of the rectangular box 300 of FIG. 3A with the internal geometry of encapsulation material 350 in a middle M of the height 330 of the rectangular box, according to an exemplary embodiment of the disclosed subject matter.

FIG. 4 illustrates a close-up side view of the rectangular box 300 of FIG. 3A with the internal geometry of encapsulation material 350, according to an exemplary embodiment of the disclosed subject matter. In FIG. 4, the internal geometry of encapsulation material 350 is shown from a first end 351, which illustrates the cylindrical, rod-like structure of each individual piece of the encapsulation material 350. As also seen in FIG. 4, the encapsulation material 350 is positioned and extends across approximately a middle or centerline M of the rectangular box 300. In this embodiment, the internal geometry of encapsulation material 350 includes 165 cylinders of encapsulation material 350 placed along the centerline M. Although in FIG. 4, the 165 cylinders appear to be side-by-side and in direct contact with the cylinders on each side, they actually are spaced slightly and substantially evenly apart from each other. In one alternative, although not limiting, arrangement of the cylinders of encapsulation material 350 in FIG. 4 can be arranged in a grid pattern where the horizontal and vertical spacing of the grid is constant (see, e.g., FIG. 7). In each of the alternative embodiments, each of the rectangular boxes 200, 300 are assumed to hold 11.875 kg of PCM. Since the heat of fusion is 161 kJ/kg, all containers in the present example hold 1,911 kJ of thermal energy due to phase change only.

Figure 5A:
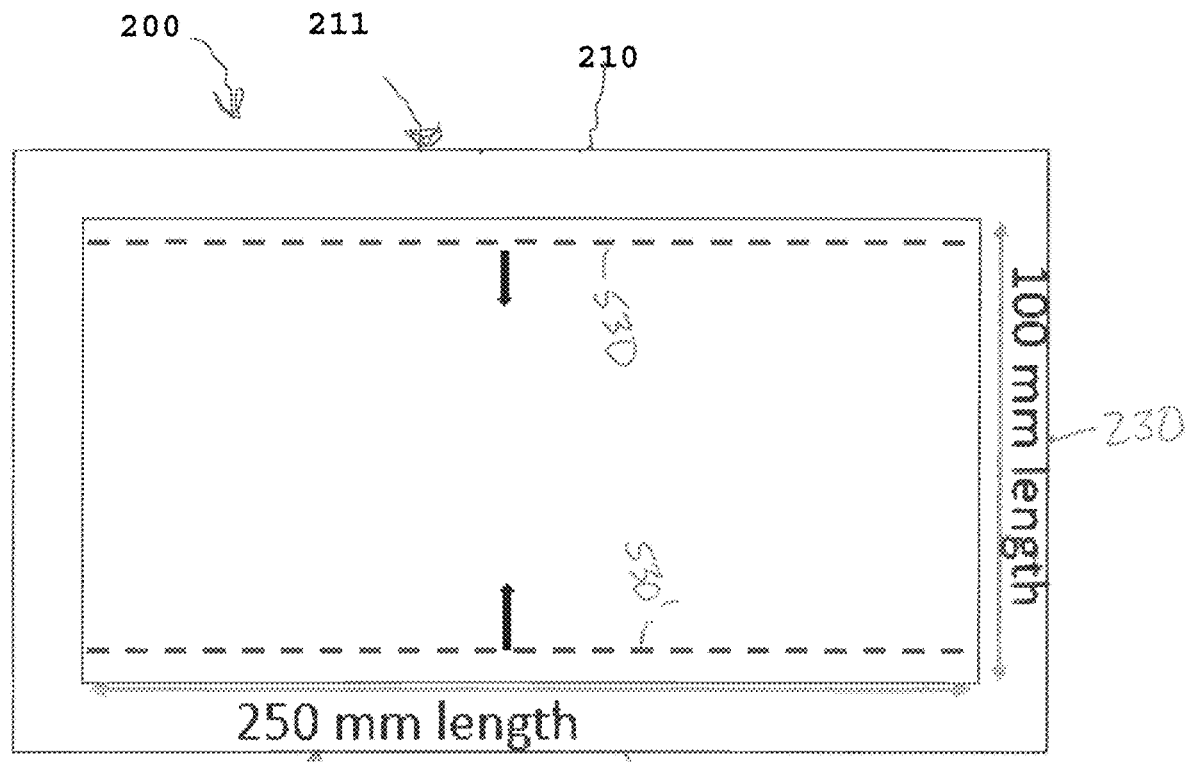
FIG. 5A illustrates dual characteristic lengths of a plane wall solidification example showing two solidification propagation paths of a PCM in a volume as shown in the rectangular box in FIGS. 2A-C, according to an exemplary embodiment of the disclosed subject matter.

FIG. 5A illustrates dual characteristic lengths of a plane wall solidification example showing two solidification propagation paths 530, 530' of a PCM in a volume as shown in the rectangular box 200 in FIGS. 2A-C, according to an exemplary embodiment of the disclosed subject matter. As seen in FIG. 5A, the two propagation paths 530, 530' are shown as dashed lines and seen to move away from the top 211 and bottom 212, respectively, and toward the middle or centerline M of the rectangular box 200. Because of this two-direction solidification, the time needed to solidify the PCM is one quarter (¼ or 0.25) of what it would take if the solidification only occurred from either the top 311 toward the bottom 312 or the bottom 312 toward the top 311.

Figure 5B:
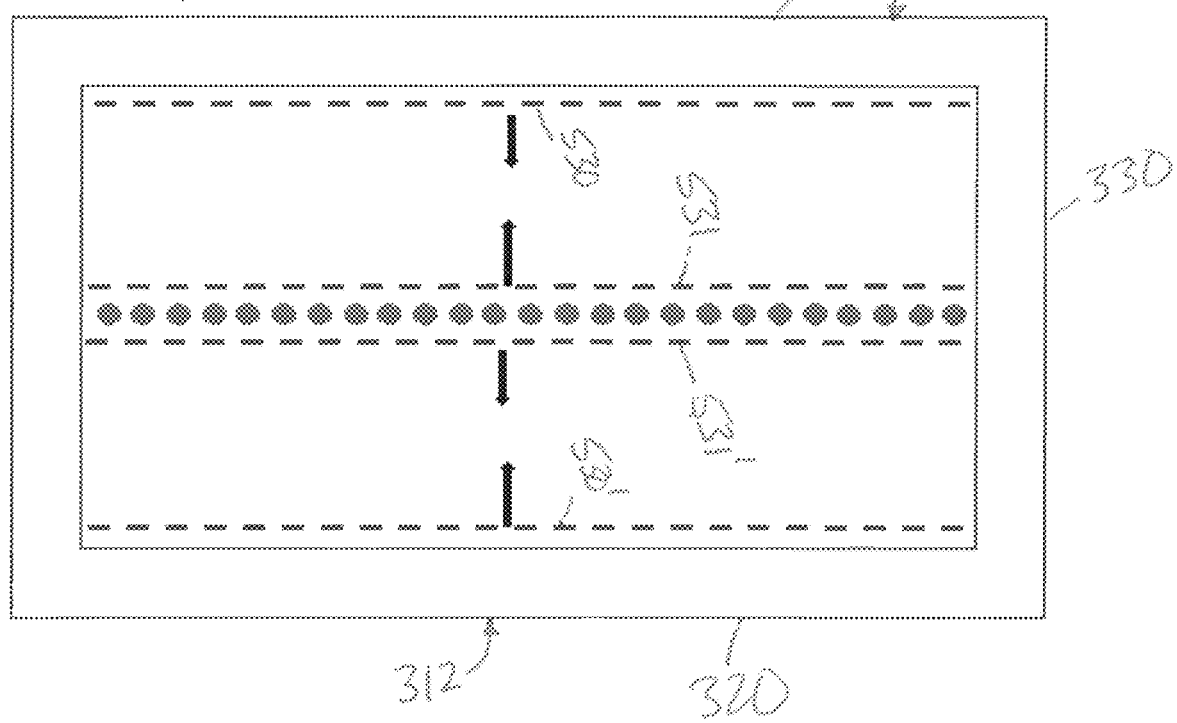
FIG. 5B illustrates two dual characteristic lengths of a plane wall solidification example showing four solidification propagation paths of a PCM in a volume as shown in the rectangular box in FIGS. 3A-C with the centrally-located internal geometry of encapsulation material, according to an exemplary embodiment of the disclosed subject matter.

FIG. 5B illustrates two dual characteristic lengths of a plane wall solidification example showing four solidification propagation paths 530, 530', 531, 531' of a PCM in a volume as shown in the rectangular box 300 in FIGS. 3A-C with the centrally-located internal geometry of encapsulation material 350, according to an exemplary embodiment of the disclosed subject matter. In FIG. 5B, the internal geometry of encapsulation material 350 is arranged along the centerline M of the rectangular box 300 and parallel to the top 311 and bottom 312. As seen in FIG. 5B, the four solidification propagation paths 530, 530', 531, 531' are shown as dashed lines. Of these, the two outer solidification propagation paths 530, 530' are seen to move away from the top 311 and bottom 212 and toward the internal geometry of encapsulation material 350 along the centerline M of the rectangular box 300, respectively. The two inner solidification propagation paths 531, 531' are seen to move away from opposite sides of the internal geometry of encapsulation material 350 along the centerline M of the rectangular box 300 and toward the top 311 and bottom 312, respectively. Because of this four-direction solidification, the time needed to solidify the PCM is one sixteenth (1/16 or 0.0625) of what it would take if the solidification only occurred from either the top 311 toward the bottom 312 or the bottom 312 toward the top 311.

For the sake of simplicity of illustration, in FIG. 5A, the solidification front is assumed to propagate inward from the top wall 211 and the bottom wall 212, toward the centerline M of the rectangular box 200. The solidification fronts are shown in dashed line with arrows indicating the direction of the propagation of the solidification fronts. For the case without internal geometry, since the fronts propagate from both walls, the distance traversed to solidify the volume is ½*100 mm=50 mm. Therefore the approximate time required is t=2500/0.15=16, 667 seconds. Since the thermal energy held by phase change is 1,911 kJ, the corresponding average heat extraction rate for the container without geometry is 0.114 kW (kilowatts). This is calculated from: 1911 kJ/16667 s=0.114 kW, note 1 kW=1 kJ/s.

For the case with the internal geometry in FIG. 4, the solidification front is assumed to propagate inward from the top wall 311 and the bottom wall 312, and radially outward from the internal geometry of encapsulation material 350.

FIG. 5B shows the solidification front propagation with the inclusion of a row of cylinders placed along the centerline M. There are 165 cylinders in the row (not all of which are shown in FIG. 5B, but are shown in FIG. 4. The center-to-center spacing between the 1 mm diameter cylinders is 1.5 mm, which results in a 0.5 mm space between adjacent cylinders. With this added geometry, the length scale reduces to $L_c$=0.5 (50 0.5)=24.75 mm. This corresponds to a solidification time of 4,084 seconds, and corresponding average heat extraction rate of 0.468 kW.

FIG. 6A illustrates a perspective view of a rectangular box 600 with a 3D internal rectangular volume with a substantially equally dispersed internal geometry of encapsulation material 650, according to an exemplary embodiment of the disclosed subject matter. The rectangular box 600 with a 3D internal rectangular volume with a substantially equally dispersed internal geometry of encapsulation material 650 has an internal volume of V', similar to the rectangular box 200 in FIG. 3A. In FIG. 6A, the internal geometry of encapsulation material 650 is formed by 165 cylinders 650, but instead of being in a single row as in FIGS. 3A-D, 4 and 5B, they are evenly dispersed throughout the rectangular box 600. A top 611 is defined by two parallel top edge lengths 610 and two parallel top edge widths 620 with top edged lengths 610 being perpendicular to the two top edge widths 620 and are connected to each other at their respective ends, and a bottom 612 is defined by bottom edge lengths 610 and bottom edge widths 620 that mirror the top edge lengths and top edge widths 620. Connecting the top 611 and bottom 612 are four sides 616, 617, 618, 619 where two sides 616, 618 are defined by one top edge length 610, one bottom edge length 610 and two heights 630, while the other two sides 617, 619 are defined by one top edge length 620, one bottom edge length 620 and two heights 630. This example illustrates the effect of internal geometry, and its spatial distribution, on the solidification time of the rectangular box 600, which shows an internal rectangular volume whose dimensions are 100×250×250 mm³, which equals an internal volume size of 6,250,000 mm³ (or 0.00625 m³) and has an inner surface area of 225,000 mm². Therefore, the rectangular box 600 has outer dimensions of 104×254×254 mm³ and a uniform shell thickness 640 of 2 mm. If each of the 165 cylinders 650 has a diameter of 1 mm and a length of 250 mm, then the volume taken up by the distribution of 165 cylinders 350 is 32,398 mm³, which is 0.5% of the internal volume V without the 165 cylinders 650. In addition, the surface area added by the distribution of 165 cylinders 350 is 129,591 mm², which constitutes a 57% internal area increase.

FIG. 6B illustrates the side view 618 of the rectangular box of FIG. 6A showing the lengths of the substantially equally dispersed internal geometry of encapsulation material 650, according to an exemplary embodiment of the disclosed subject matter.

FIG. 6C illustrates the side view 619 of the rectangular box of FIG. 6A showing the diameters of the substantially equally dispersed internal geometry of encapsulation material 650, according to an exemplary embodiment of the disclosed subject matter.

FIG. 7 illustrates a close-up side view of the rectangular box 600 of FIG. 6C with the substantially equally dispersed internal geometry of encapsulation material 650, according to an exemplary embodiment of the disclosed subject matter. As seen in the embodiments of FIGS. 6A-C and 7 a second spatial variation of the 165 cylinders 650 are distributed in a grid of 11 rows by 15 columns. As seen in the embodiment in FIG. 7, an inter-column cylinder 650 center-to-center distance 701 is, for example, 16.5 mm, an inter-row cylinder 650 center-to-center distance 703 is, for example, 8.5 mm, a column to side wall distance 705 between the first column of cylinders 702 and the left side wall 630 is, for example, 9.5 mm, and a bottom row 711 to bottom wall 620 (or top row 713 to top wall 610) distance 707 is, for example, 7.5 mm.

In the embodiment in FIG. 7, the solidification front is assumed to propagate inward from the top and bottom walls, and radially outward from each cylinder. Here there are two options for approximation of the characteristic length scale, $L_c$. A first option is the distance between the left wall 630 and the first column of cylinders 702 (or the distance between the right wall 630' and last column of cylinders 704) which is $L_{c1}$=9.5−0.5=9 mm. A second option is half of a hypotenuse 810 of a 4 cylinder grid 800 (since the front propagates radially from each cylinder), which is $L_{c2}$=8.78 mm and is discussed below in relation to FIG. 8.

FIG. 8 illustrates a close-up view of inter rod spacing in the rectangular box of FIGS. 6A and 7, according to an exemplary embodiment of the disclosed subject matter. In FIG. 8, a second spatial variation of the 165 cylinders is shown. Here they are distributed in a grid of 11 rows by 15 columns. In this example, the solidification front is assumed to propagate inward from the top and bottom walls, and radially outward from each cylinder. Here we have two options for approximation of the characteristic length scale, $L_c$. As discussed above, the first option is the distance between the left wall and first column of cylinders (or distance between the right wall and last column of cylinders) which is $L_{c1}$=9.5−0.5=9 mm. The second option is half of a hypotenuse 810 of a 4 cylinder grid 800 (since the front propagates radially from each cylinder), which is calculated using $L_{c2}=0.5(\sqrt{16.5^2+8.5^2})-1$, so $L_{c2}$=8.78 mm. Recall that, if the solidification front propagation is multi-directional, generally the characteristic length scale is set equal to the largest distance the front will have to traverse. This allows for a conservative approximation of the associated solidification time. Therefore, the maximum between the two lengths is $L_c$=9 mm, which corresponds to a solidification time of 540 seconds, and a corresponding average heat extraction rate of 3.54 kW.

FIG. 9 illustrates a cross-sectional view of a substantially spherical ePCM 900 without any internal geometry of encapsulation material, according to an exemplary embodiment of the disclosed subject matter. In FIG. 9, the ePCM 900 includes an enclosed outer shell 910 of an encapsulation material that contains, encloses and/or holds a volume of PCM 920 that is less than an available volume V of the ePCM 900, which results in a void space 911 inside of the enclosed outer shell 910. In general, this void space is sized to accommodate a volumetric change of the PCM from phase change during the charge/discharge cycle. Although not shown in FIG. 9, the ePCM 900 may include a second, internal encapsulation material, as shown in FIG. 10. In FIG. 9 the primary length scale of the solidification is the radius of the sphere, so, if, for example, an inner diameter of the sphere is 20 mm, the radius is 10 mm.

FIG. 10 illustrates a cross-sectional view of another substantially spherical ePCM 1000 with a branching internal geometry of encapsulation material 1050, according to an exemplary embodiment of the disclosed subject matter. In FIG. 10, the ePCM 1000 includes an enclosed outer shell 1010 of an encapsulation material that contains, encloses and/or holds a volume of PCM 1020 that is less than an available volume V of the ePCM 1000, which results in a void space 1011 inside of the enclosed encapsulating outer shell 1010. In general, this void space is sized to accommodate an expansion of the PCM 1020 during the phase change process. The ePCM 1000 can include a protective layer 1030, which here is seen attached to an interior wall of the ePCM 1000. The reason for the protective layer 1030 can depend on the application. For example, if the PCM 1020 and encapsulating outer shell 1010 are metals, the purpose of the protective layer 1030 is to prevent one metal from dissolving the other. For example, the encapsulating outer shell 1010 is copper, while the PCM 1020 is tin. The other reason could be preventing corrosion. For example, if the casing is a metal while the PCM 1020 is a molten salt, then the protective layer 1030 is there to prevent corrosion. On the other hand, if the ePCM 1000 with the encapsulating outer shell 1010 material is put in use in an application, for example, in nuclear energy where the ePCM 1000 is immersed in a heat transfer fluid 1070, where the PCM 1020 and the heat transfer fluid 1070 of the application are both molten salts, then the protective layer 1030 would need to exist on either side of the primary casing (note this is for the case when the primary casing is metal). Additive manufacturing technologies allow for easy implementation of the protective layer 1030, on one or both sides of the primary encapsulation material 1010, without greatly affecting the manufacturing steps. In addition, if the volumetric expansion of the PCM 1020 is negligble, the void 1011 may not be needed.

In FIG. 10, the encapsulating outer shell 1010 material is composed of two materials for the cases where the phase change material needs to be separated from the casing material. The protective layer 1030 can be on the inside of the primary casing material or on both sides of the primary casing material which is dictated by the application. In FIG. 10, the internal geometry 1050 causes a decrease in the characteristic length scale to decrease the solidification time. In other words, the internal geometry 1050 augments the non-dimensional Rayliegh, Grashof, Fourier, and Stefan numbers by affecting the characteristic length scale of the problem. Note that in the embodiment shown in FIG. 10, while the internal structure is seen in a plane, this is not necessarily the only or an optimum geometry, so additional, 3 dimensional internal structures or internal geometries are possible and contemplated. For example, the internal geometry 1050 may also be, but is not limited to, a tortuous, non-symmetric configuration such that different 2D slices through a center of the sphere 1000 show different internal shapes and that are connected in three dimensions. Alternatively, the internal geometry 1050 may also be, but is not limited to, a symmetric configuration such that different 2D slices through a center of the sphere 1000 show substantially the same shape and that are connected in three dimensions.

Although not shown in FIG. 9, in some embodiments of the disclosed subject matter the ePCM 900 can include the second, internal encapsulation material 1030, as shown in FIG. 10. Similarly, although not shown in FIG. 10, in some embodiments of the disclosed subject matter the ePCM 1000 does not include the second, internal encapsulation material 1030.

Figure 11:
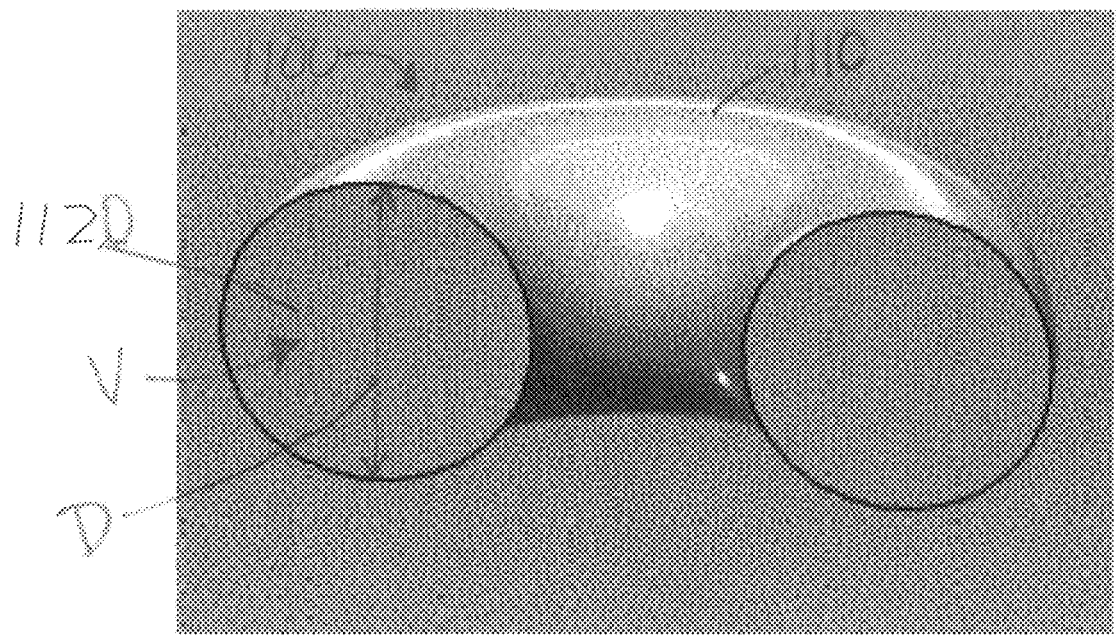
FIG. 11 illustrates a top perspective, cross-sectional view of a substantially annular ring or ring torus shaped ePCM without any internal encapsulation material and an internal volume, according to an exemplary embodiment of the disclosed subject matter.

FIG. 11 illustrates a top perspective, cross-sectional view of a substantially annular ring or ring torus shaped ePCM 1100 without any internal encapsulation material and having an internal volume $V_1$, according to an exemplary embodiment of the disclosed subject matter. In FIG. 11, the ePCM 1100 includes an outer shell 1110 material, which can be any of the above disclosed materials and the ePCM 1100 has a diameter D and contains a PCM 1120 substantially equal to the internal volume $V_1$. In this embodiment, the PCM 1120 does not expand and contract during the phase change process, so there is no void space in the internal volume $V_1$, however, in other embodiments of the disclosed subject matter, there can be a void space and a lower volume of the PCM 1120 in the internal volume $V_1$. Similar to the above discussed other embodiments of the disclosed subject matter, the ePCM 1100 can also include a protective layer (see, protective layer 1030 in FIG. 10) on one or both sides of the outer shell 1110 material in FIG. 11.

Figure 12:
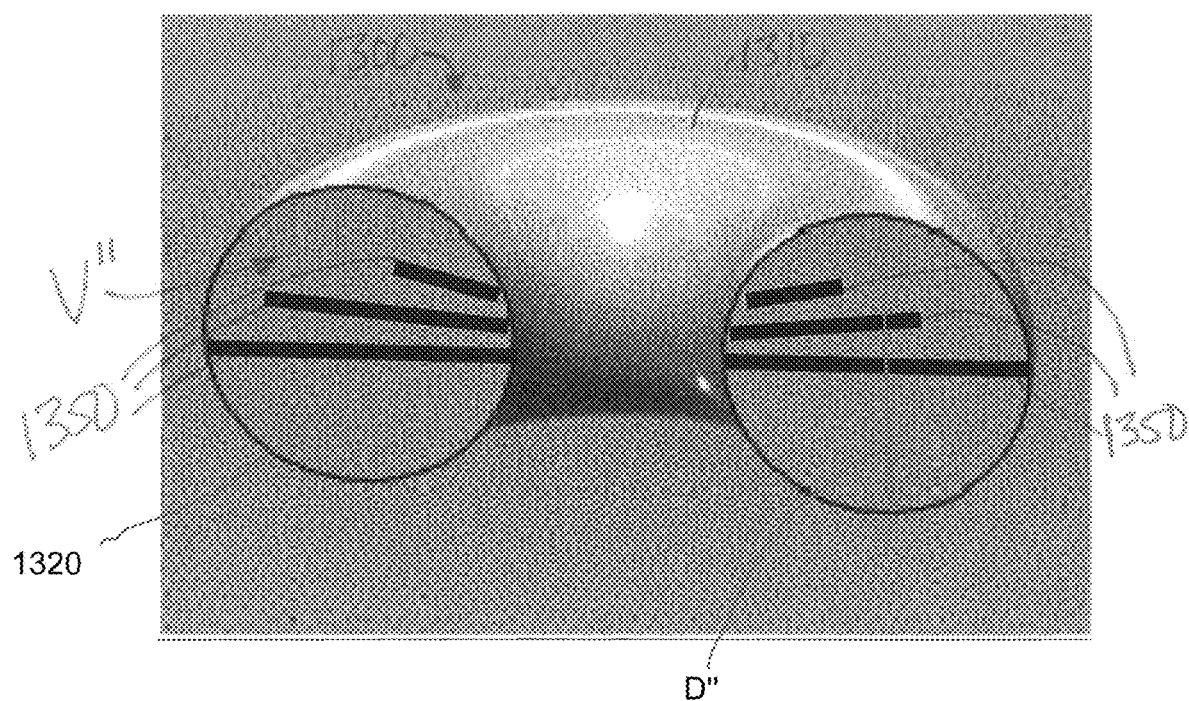
FIG. 12 illustrates a top perspective, cross-sectional view of a substantially annular ring or ring torus shaped ePCM with a plurality of substantially equally spaced rods of encapsulation material located along a horizontal axis of the substantially annular ring or ring torus shaped ePCM and an internal volume, according to an exemplary embodiment of the disclosed subject matter.

FIG. 12 illustrates a top perspective, cross-sectional view of a substantially annular ring or ring torus shaped ePCM 1300 with a plurality of substantially equally spaced rods of encapsulation material 1350 located along a horizontal axis of the substantially annular ring or ring torus shaped ePCM 1300 and an internal volume $V_1''$, according to an exemplary embodiment of the disclosed subject matter. In FIG. 12, the ePCM 1300 includes an outer shell 1310 material, which can be any of the above disclosed materials and the ePCM 1300 has a diameter D" and contains a PCM 1320 substantially equal to the internal volume $V_1''$. The plurality of substantially equally spaced rods of encapsulation material 1350 and are connected between an inside surface of an outer wall of the outer shell 1310 and an inside surface of an inner wall of the outer shell 1310. In this embodiment, the PCM 1320 does not expand and contract during the phase change process, so there is no void space in the internal volume $V_1''$, however, in other embodiments of the disclosed subject matter, there can be a void space and a lower volume of the PCM 1320 in the internal volume $V_1''$. Similar to the above discussed other embodiments of the disclosed subject matter, the ePCM 1300 can also include a protective layer (see, protective layer 1030 in FIG. 10) on one or both sides of the outer shell 1310 material in FIG. 13.

Figure 13:
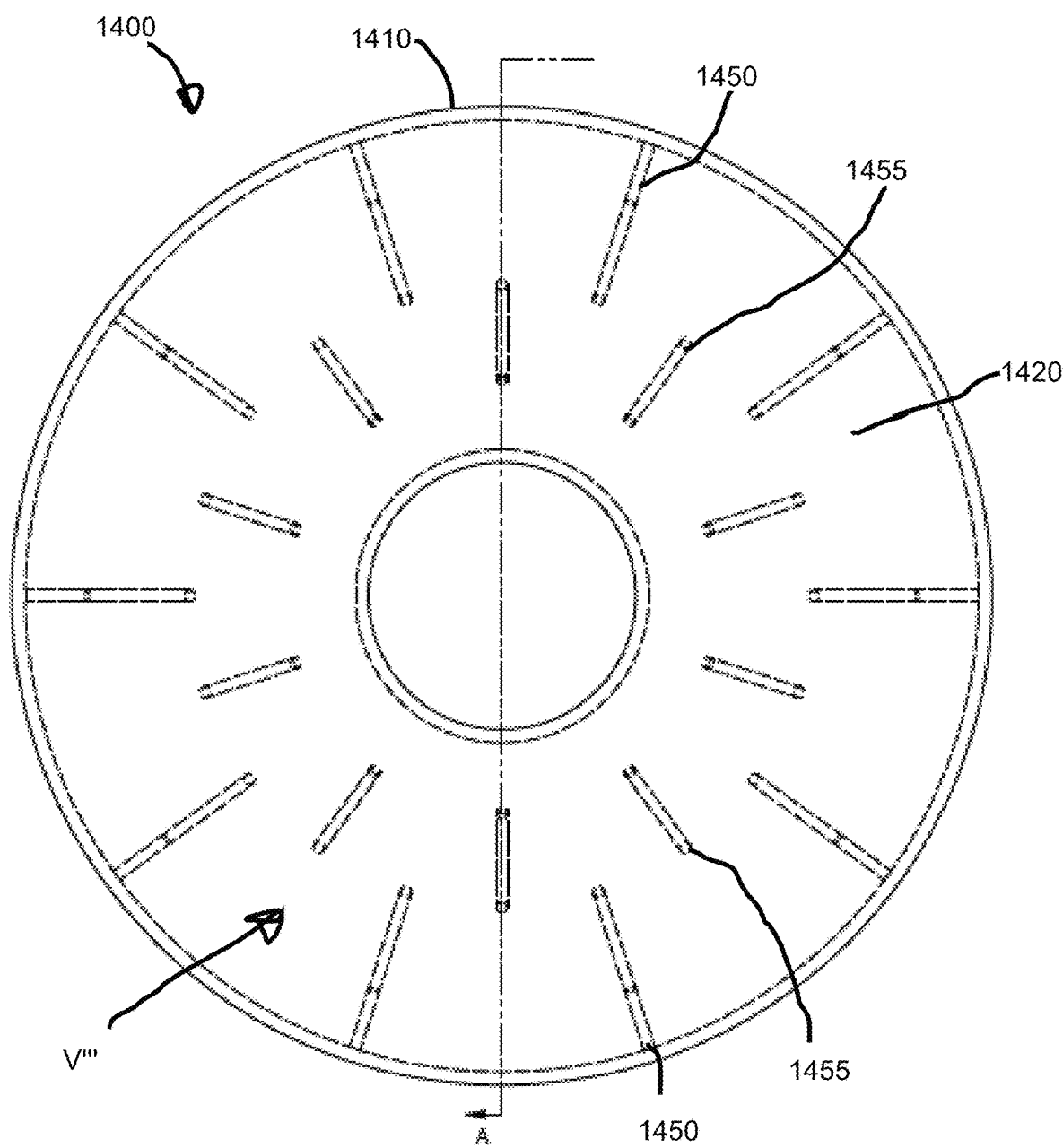
FIG. 13 illustrates a top plan view of a substantially annular ring or ring torus shaped ePCM showing in broken line a plurality of spaced internal structures of encapsulation material located within an internal volume of the annular ring or ring torus shaped ePCM, according to an exemplary embodiment of the disclosed subject matter.

FIG. 13 illustrates a top plan view of a substantially annular ring or ring torus shaped ePCM 1400 showing in broken line a plurality of spaced internal structures of encapsulation material 1450, 1455 located within an internal volume $V_1'''$ of the annular ring or ring torus shaped ePCM 1400, according to an exemplary embodiment of the disclosed subject matter. In FIG. 13, the ePCM 1400 includes an outer shell 1410 material, which can be any of the above disclosed materials and the ePCM 1400 has a diameter D'" (best seen in FIG. 14) and contains a PCM 1420 substantially equal to the internal volume $V_1'''$. A first of the two pluralities of spaced internal structures of encapsulation material 1450 are connected between an inside surface of an outer wall of the outer shell 1410 and an inside surface of a bottom wall of the outer shell 1410. A second of the two pluralities of spaced internal structures of encapsulation material 1455 are connected between an inside surface of a top wall of the outer shell 1410 and the inside surface of the bottom wall of the outer shell 1410. In this embodiment, the PCM 1420 does not expand and contract during the phase change process, so there is no void space in the internal volume $V_1'''$, however, in other embodiments of the disclosed subject matter, there can be a void space and a lower volume of the PCM 1420 in the internal volume $V_1'''$. Similar to the above discussed other embodiments of the disclosed subject matter, the ePCM 1400 can also include a protective layer (see, protective layer 1030 in FIG. 10) on one or both sides of the outer shell 1410 material in FIG. 13.

FIG. 14 illustrates a cross-sectional view of the substantially annular ring or ring torus shaped ePCM 1400 of FIG. 13 along line A-A with the at least two pluralities of spaced internal structures of encapsulation material 1450, 1455 located within the internal volume $V_1'''$ of the annular ring or ring torus shaped ePCM 1400, according to an exemplary embodiment of the disclosed subject matter. In FIG. 14, the first of the two pluralities of spaced internal structures of encapsulation material 1450 are connected between the inside surface of the outer wall of the outer shell 1410 and the inside surface of the bottom wall of the outer shell 1410. The second of the two pluralities of spaced internal structures of encapsulation material 1455 are connected between the inside surface of the top wall of the outer shell 1410 and the inside surface of the bottom wall of the outer shell 1410.

FIG. 15 illustrates a see-through, cross-sectional view of the substantially annular ring or ring torus shaped ePCM 1400 of FIG. 14 without surface shading to show the internal structure of the at least two pluralities of spaced internal structures of encapsulation material 1450, 1455 located within the internal volume $V_1'''$ of the annular ring or ring torus shaped ePCM 1400, according to an exemplary embodiment of the disclosed subject matter.

FIG. 16 illustrates a flow diagram of a method of manufacturing an encapsulated phase change material, in accordance with an exemplary embodiment of the disclosed subject matter. In FIG. 16, a method 1700 starts (1710) and then generates (1720) substantially all of a hollow, 3-D structure from at least a first material using an additive manufacturing technique, where the first material has a first melting point. The method then provides (1730) a phase change material inside of the hollow, 3-D structure using at least a second material, where the second material has a second melting point and where the second melting point is lower than the first melting point of the first material, and a volume of the second material is equal to or less than an inner volume of the hollow, 3-D structure. The method then completes (1740) and seals the hollow, 3-D structure with the at least a first material using the additive manufacturing technique to enclose the second material inside of the 3-D structure. Finally, the method ends (1750). The method is repeatable and, although not shown, the method can optionally determine that additional encapsulated phase change materials are to be manufactured prior to ending (1750) and, if more are to be manufactured, the method can loop back to the beginning of the method and continue with the generates (1720) step. The first material and the second material used in the above and following methods are as described herein.

FIG. 17 illustrates a flow diagram of a method of manufacturing an encapsulated phase change material, in accordance with another exemplary embodiment of the disclosed subject matter. In FIG. 17, a method 1800 starts (1810) and then generates (1820) substantially all of a hollow, 3-D structure from at least a first material using an additive manufacturing technique, where the first material has a first melting point. The method then generates (1830) a volume of a phase change material inside of the hollow, 3-D structure using at least a second material, the second material having a second melting point where the second melting point is lower than the first melting point of the first material and the volume of the second material being equal to or less than an inner volume of the hollow, 3-D structure. The method then completes (1840) and seals the hollow, 3-D structure with the at least a first material using the additive manufacturing technique to enclose the second material inside of the 3-D structure. Finally, the method ends (1850). The method is repeatable and, although not shown, the method can optionally determine that additional encapsulated phase change materials are to be manufactured prior to ending (1850) and, if more are to be manufactured, the method can loop back to the beginning of the method and continue with the generates (1820) step.

FIG. 18 illustrates a flow diagram of a method of manufacturing an encapsulated phase change material, in accordance with yet another exemplary embodiment of the disclosed subject matter. In FIG. 18, a method 1900 starts (1910) and then generates (1920) a sealed, hollow, 3-D structure from at least a first material using an additive manufacturing technique, where the first material has a first melting point. The method then generates (1930) a volume of a phase change material inside of the hollow, 3-D structure using at least a second material simultaneously with the generating of the 3-D structure, the second material having a second melting point where the second melting point is lower than the first melting point of the first material and the volume of the second material being equal to or less than an inner volume of the hollow, 3-D structure. Finally, the method ends (1940). The method is repeatable and, although not shown, the method can optionally determine that additional encapsulated phase change materials are to be manufactured prior to ending (1940) and, if more are to be manufactured, the method can loop back to the beginning of the method and continue with the generates (1920) step.

As discussed above, conventional manufacturing methods have problems of creating an encapsulated volume comprising of a PCM and void, where the encapsulation constitutes an impermeable contiguous layer. In addition, if the encapsulation material should be protected, additional difficulty arises for creating a contiguous protection layer on the inner surface, outer surface, or both sides of the primary encapsulation material.

The presently disclosed subject matter utilizes the benefits of additive manufacturing to create an capsule with PCM and void in a few manufacturing steps, for example, but not limited to: 1) printing most of the capsule, 2) filling the partially printed capsule volume with a liquid PCM and allow it to solidify, and 3) printing the rest of the capsule. Additive manufacturing also allows the inclusion of protection layers on one, or both, sides of the primary encapsulating material. In addition, additive manufacturing can be used to create a shell with functionally graded properties, such that the encapsulating material shell is composed of one layer.

The second use of additive manufacturing to improve upon prior art is to introduce internal geometry in the capsule. The presence of the internal geometry is for accomplishing two goals simultaneously: 1) increase wetted surface area between PCM and container; and, 2) decrease a characteristic length scale for reducing solidification time. The same internal geometry can be distributed different ways for different solidification times.

The presently disclosed subject matter applies to an encapsulated volume, for example, but not limited to, a capsule shape with macroscopic dimensions on the scale of millimeters and larger. The primary material encapsulation outer shell thickness can be, generally, but is not limited to, 0.5 mm or larger. The protection layer thickness can be, generally, but is not limited to, 0.2 mm or larger. Similarly, the internal geometry thickness can be, generally, but is not limited to, 0.5 mm or larger. In some embodiments, the internal volume can be broken up in the following percentages: 5% or less of the volume is for the internal geometry, 90% or less is for the liquid PCM (which is then allowed to solidify), while the remainder is for the void. Note these are guidelines only; deviations may be required as dictated by application and the specific materials used for the PCM.

In embodiments of the disclosed subject matter, the PCM can include, for example, but is not limited to, aluminum, silicon, and aluminum-silicon eutectic, a single salt or a mixture of salts (for example, sodium chloride, solar salt, or a single or a mixture of nitrate salts), a eutectic of salts (for example, sodium chloride, magnesium chloride, or potassium chloride), a metal-container system composed of one or more metalsw characterized by a phase diagram immiscibility, for example, but not limited to a miscibility gap alloy, such as, an Al—Sn alloy or an Fe—Cu alloy.

Possible additive manufacturing techniques for creation of the 3-D structure and/or capsule include using an electron beam or laser, which may incorporate manufacturing under vacuum, or reduced pressure conditions, a laser/vacuum system & process, as well as, a light-curable, based additive manufacturing technology. In addition to the previously discussed internal geometries, alternative internal geometry embodiments of the presently disclosed subject matter can include: internal geometries that are not fully solid, e.g., annular through-hole/passages; the inner walls of the 3-D structure and/or capsule do not have to be planar only, e.g., they can be curved, sinusoidal, or represented by a mathematical function; the geometry of the 3-D structure and/or capsule can be rectangular, cylindrical, annular cylindrical, spherical, toroidal, etc.; the internal geometry do not have to be cylinders with constant cross-sectional area; the internal geometry can have one or plurality of intersections; the internal geometry can intersect such that one geometry is an annulus with a through hole, while the other is solid cylinder that intersects with the wall of the annulus, but does not penetrate through it; and the internal geometry may be tortuous, such as a helicoid. It should be noted that the surface of the 3-D structure and/or capsule does not need to be smooth.

In an embodiment of the disclosed subject matter, a method of manufacturing an encapsulated phase change material includes: generating substantially all of a hollow, 3-D structure from at least a first material using an additive manufacturing technique, the first material having a first melting point; providing a phase change material inside of the hollow, 3-D structure using at least a second material, the second material having a second melting point where the second melting point is lower than the first melting point of the first material and a volume of the second material being equal to or less than an inner volume of the hollow, 3-D structure; and completing and sealing the hollow, 3-D structure with the at least a first material using the additive manufacturing technique to enclose the second material inside of the 3-D structure.

In an embodiment of the disclosed subject matter, a method of generating a hollow, 3-D structure from at least a first material using an additive manufacturing technique, the first material having a first melting point; generating a volume of a phase change material inside of the hollow, 3-D structure using at least a second material, the second material having a second melting point where the second melting point is lower than the first melting point of the first material and the volume of the second material being equal to or less than an inner volume of the hollow, 3-D structure; and completing and sealing the hollow, 3-D structure with at least the first material using the additive manufacturing technique to enclose the second material inside of the 3-D structure.

In an embodiment of the disclosed subject matter, a method of manufacturing an encapsulated phase change material, the method comprising: generating a sealed, hollow, 3-D structure from at least a first material using an additive manufacturing technique, the first material having a first melting point; and generating a volume of a phase change material inside of the hollow, 3-D structure using at least a second material simultaneously with the generating of the 3-D structure, the second material having a second melting point where the second melting point is lower than the first melting point of the first material and the volume of the second material being equal to or less than an inner volume of the hollow, 3-D structure.

While the disclosed subject matter has been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the disclosed subject matter described herein.

What is claimed is:

1. A method of manufacturing an encapsulated phase change material, the method comprising:
   generating substantially all of a seamless, leak free and substantially hollow 3-D structure from at least a first material using an additive manufacturing technique, the first material having a first melting point;
   providing a phase change material inside of the seamless, leak free and substantially hollow 3-D structure using at least a second material, the second material having a second melting point where the second melting point is lower than the first melting point of the first material and a volume of the second material being equal to or less than an inner volume of the seamless, leak free and substantially hollow 3-D structure; and
   completing and sealing the seamless, leak free and substantially hollow 3-D structure with the at least first material using the additive manufacturing technique to enclose the second material inside of the seamless, leak free and substantially hollow 3-D structure;
   wherein at least the generating and completing and sealing steps are performed under a vacuum; and
   wherein the generating step further comprises generating the seamless, leak free and substantially hollow 3-D structure with a first predetermined internal structure connected to at least two locations on an internal surface and extending across a middle of the seamless, leak free and substantially hollow 3-D structure.

2. The method of claim 1, wherein the generating step further comprises:
   generating leak free a second predetermined internal structure connected to at least two different locations from the first predetermined internal structure connection locations on the internal surface and extending across the middle of the seamless, leak free and substantially hollow 3-D structure and a section of the second predetermined internal structure connected to a section of the first predetermined internal structure.

3. The method of claim 2, wherein the first predetermined internal structure is generated to be a random-shaped structure.

4. The method of claim 2, wherein the first predetermined internal structure is generated to be a plurality of cylindrical rods extending across a middle of the seamless, leak free and substantially hollow 3-D structure.

5. The method of claim 4, wherein each of the plurality of cylindrical rods is generated to have a hollow core.

6. The method of claim 4, wherein the plurality of cylindrical rods are generated to be evenly spaced across the seamless, leak free and substantially hollow 3-D structure.

7. The method of claim 6, wherein each of the plurality of cylindrical rods is generated to have a hollow core.

8. The method of claim 1, wherein the seamless, leak free and substantially hollow 3-D structure is generated to further comprise:
generating the seamless, leak free and substantially hollow 3-D structure with a third material covering the internal surface of the seamless, leak free and substantially hollow 3-D structure.

9. The method of claim 8, wherein the seamless, leak free and substantially hollow 3-D structure is generated to further comprise:
generating the seamless, leak free and substantially hollow 3-D structure with a fourth material covering the external surface of the seamless, leak free and substantially hollow 3-D structure.

10. The method of claim 9, wherein the third material and the fourth material provide a protective covering for the seamless, leak free and substantially hollow 3-D structure.

11. A method of manufacturing an encapsulated phase change material, the method comprising:
generating a seamless, leak free and substantially hollow 3-D structure from at least a first material using an additive manufacturing technique, with an internal surface and an external surface and at least one predetermined internal structure having a first end and a second end, and connected at the first end to a first location on the internal surface of the seamless, leak free and substantially hollow 3-D structure and connected at the second end to either a second location on the internal surface of the seamless, leak free and substantially hollow 3-D structure or at an intersection with an at least one second predetermined internal structure, the first material having a first melting point, and extending across a middle of the seamless, leak free and substantially hollow 3-D structure;
generating a volume of a phase change material inside of the seamless, leak free and substantially hollow 3-D structure using at least a second material, the second material having a second melting point where the second melting point is lower than the first melting point of the first material and the volume of the second material being equal to or less than an available inner volume of the seamless, leak free and substantially hollow 3-D structure; and
completing and sealing the seamless, leak free and substantially hollow 3-D structure with at least the first material using the additive manufacturing technique to enclose the second material inside of the seamless, leak free and substantially hollow 3-D structure;
wherein at least the generating and completing and sealing steps are performed under a vacuum.

12. The method of claim 11 wherein the generating the at least one internal structure connected between the at least two locations on the internal surface of the seamless, leak free and substantially hollow 3-D structure step further comprises:
generating a first end of the at least one second predetermined internal structure connected to one location on the internal surface of the seamless, leak free and substantially hollow 3-D structure, a second end of the at least one predetermined second internal structure connected to another location on the internal surface of the seamless, leak free and substantially hollow 3-D structure, and a portion of a middle of the at least one predetermined second internal structure connected to an external surface of one of the at least one predetermined internal structure.

13. The method of claim 12, wherein the at least one first predetermined internal structure and the at least one second predetermined internal structure are generated to be a random-shaped structure.

14. The method of claim 12, wherein the internal structure is generated to be a plurality of cylindrical rods extending across a middle of the seamless, leak free and substantially hollow 3-D structure.

15. The method of claim 14, wherein each of the plurality of cylindrical rods is generated to have a hollow core.

16. The method of claim 14, wherein the plurality of cylindrical rods are generated to be evenly spaced across the seamless, leak free and substantially hollow 3-D structure.

17. The method of claim 16, wherein each of the plurality of cylindrical rods is generated to have a hollow core.

18. The method of claim 11, wherein the seamless, leak free and substantially hollow 3-D structure is generated to further comprise:
generating the seamless, leak free and substantially hollow 3-D structure with a third material covering the internal surface of the seamless, leak free and substantially hollow 3-D structure.

19. The method of claim 18, wherein the seamless, leak free and substantially hollow 3-D structure is generated to further comprise:
generating the seamless, leak free and substantially hollow 3-D structure with a fourth material covering the external surface of the seamless, leak free and substantially hollow 3-D structure.

20. The method of claim 19, wherein the third material and the fourth material provide a protective covering for the seamless, leak free and substantially hollow 3-D structure.

* * * * *